United States Patent
Tai et al.

(10) Patent No.: US 6,759,107 B1
(45) Date of Patent: *Jul. 6, 2004

(54) OXYGEN ABSORBING COMPOSITIONS AND ARTICLES

(75) Inventors: Shinji Tai, Kurashiki (JP); Masakazu Nakaya, Kurashiki (JP); Hiroyuki Shimo, Kurashiki (JP); Toshiaki Sato, Kurashiki (JP); Takashi Yamashita, Tsukuba (JP); Yoshiki Mukoo, Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 9 days.

This patent is subject to a terminal disclaimer.

(21) Appl. No.: 09/612,259

(22) Filed: Jul. 7, 2000

(30) Foreign Application Priority Data

Jul. 8, 1999 (JP) .......................................... 11-194227

(51) Int. Cl.$^7$ .......................... B32B 27/04; B32B 27/08
(52) U.S. Cl. ..................... 428/36.4; 428/36.6; 428/327; 428/407
(58) Field of Search .............................. 428/36.4, 36.6, 428/327, 407

(56) References Cited

U.S. PATENT DOCUMENTS

| 5,021,515 A | 6/1991 | Cochran et al. ............ 525/371 |
| 5,246,753 A | 9/1993 | Koyama et al. ........... 428/36.7 |
| 5,346,644 A | 9/1994 | Speer et al. ............ 252/188.28 |
| 5,648,020 A | 7/1997 | Ve Speer et al. ....... 252/188.28 |
| 5,942,297 A | * 8/1999 | Ve Speer et al. .......... 428/35.4 |
| 6,254,946 B1 | * 7/2001 | Hirata et al. ................ 428/35.2 |
| 6,447,858 B1 | * 9/2002 | Shimo et al. .............. 428/35.7 |

FOREIGN PATENT DOCUMENTS

| EP | 0 525 240 | 2/1993 |
| EP | 0 546 546 | 6/1993 |
| JP | 56-118439 | 9/1981 |
| JP | 4-45144 | 2/1992 |
| JP | 4-211444 | 8/1992 |
| JP | 5-156095 | 6/1993 |
| JP | 5-170980 | 7/1993 |
| JP | 6-179792 | 6/1994 |
| JP | 9-249782 | 9/1997 |

OTHER PUBLICATIONS

Derwent Abstract, AN 1998–433921 (37), JP 10–182755, Jul. 7, 1998.

* cited by examiner

*Primary Examiner*—Sandra M. Nolan
(74) *Attorney, Agent, or Firm*—Oblon, Spivak, McClelland, Maier & Neustadt, P.C.

(57) ABSTRACT

The present invention provides a thermoplastic resin composition having excellent oxygen absorption property. This thermoplastic resin composition comprises a thermoplastic resin (A), a multilayered polymer particle (B) and a transition metal salt (C), wherein the multilayered polymer particle (B) has at least one oxygen absorption layer, the oxygen absorption layer comprises a diene polymer (B1) containing a conjugated diene monomer as a polymerization component, and the transition metal salt (C) is contained in an amount of 1 to 5000 ppm in terms of a metal element thereof.

25 Claims, No Drawings

OXYGEN ABSORBING COMPOSITIONS AND ARTICLES

BACKGROUND OF THE INVENTION

1. Field of the Invention

The present invention relates to a thermoplastic resin composition having oxygen absorbency. The present invention further relates to a resin composition having good gas barrier properties against oxygen, carbon dioxide gas or the like, good moisture-resistance, good aroma retentivity, and good flavor barrier properties, in addition to good oxygen absorbency. The present invention further relates to a multilayered structure using such a composition that has a good appearance, in particular good transparency, in uses such as packaging containers for drinks, foods, medicines, cosmetics and the like.

2. Description of the Related Art

Gas barrier resins such as an ethylene-vinyl alcohol copolymer (hereinafter may be referred to as EVOH) generally can be melt-molded, and thus are used in a wide range as a material having excellent oxygen or carbon dioxide gas barrier properties to be formed into packaging films, sheets, bottles and containers. Multilayered gas-barrier resin packaging materials obtained by laminating the above-mentioned gas barrier resin and a thermoplastic resin having excellent moisture resistance, mechanical properties and the like, especially polyolefin resin, are broadly used as containers that have excellent oxygen barrier properties in the form of bags, bottles, cups and pouches, for example, in a variety of fields such as foods, cosmetics, medicines, chemicals and toiletries.

The above packaging materials using gas barrier resins have good barrier properties against oxygen and carbon dioxide gas. However, the permeability thereof against gases such as oxygen gas is not exactly zero, unlike metals, used for cans and the like, and glass, used for bottles and the like, but still permits transmission of an amount of gas that is not negligible. As for packaging materials, especially for foods, the degradation of foods due to oxidation when they are preserved for an extended period of time is of great concern.

As mentioned above, in order to protect packaged contents such as foods, in particular, contents that are susceptible to oxidation or the like, a means for blocking oxygen and carbon dioxide gas such as the multilayered gas barrier resin materials can be used. Moreover, it is desired to absorb the oxygen that entered the container together with the contents during the packaging and filling of the contents in order to prevent the contents from being degraded. For this purpose, it is proposed to enclose an oxygen absorbent or to provide the oxygen absorption function to a resin of a packaging material by mixing an oxygen absorbent in the resin.

As the method of providing the oxygen absorption function to the EVOH that is a packaging material, the following methods are proposed: (1) An oxidation catalyst such as a transition metal is added to the EVOH to facilitate the oxidation of the EVOH so that oxygen can react with the EVOH as it is transmitted in a film composed of the EVOH, thereby giving the oxygen absorption function to the EVOH (Japanese Laid-Open Patent Publication No. 4-211444); (2) A mixture substantially composed of polyolefin and an oxidation catalyst is dispersed in the EVOH so that oxygen can react with the polyolefin in the EVOH as it is transmitted in a film of EVOH containing the mixture, thereby obtaining a resin composition having the oxygen absorption function (Japanese Laid-Open Patent Publication No. 05-156095); and (3) EVOH, polyolefin, and an oxidation catalyst are blended so that oxygen can react with the polyolefin and the EVOH as the oxygen is transmitted in a film of the mixture of the EVOH and polyolefin, thereby obtaining a resin composition having the oxygen absorption function (Japanese Laid-Open Patent Publication No. 05-170980).

However, method (1) fails to provide sufficiently improved oxygen barrier properties. Moreover, the transparency is not adequate due to the addition of the large amount of oxidation catalyst. Methods (2) and (3) also have a drawback in that the transparency is reduced due to the addition of polyolefin to the EVOH.

SUMMARY OF THE INVENTION

A first thermoplastic resin composition of the present invention comprises a thermoplastic resin (A), a multilayered polymer particle (B) and a transition metal salt (C), wherein the multilayered polymer particle (B) has at least one oxygen absorption layer, the oxygen absorption layer comprises a diene polymer (B1) containing a conjugated diene monomer as a polymerization component, and the transition metal salt (C) is contained in an amount of 1 to 5000 ppm in terms of a metal element thereof.

A second thermoplastic resin composition of the present invention comprises a thermoplastic resin (A) and a multilayered polymer particle (B), wherein the multilayered polymer particle (B) has at least one oxygen absorption layer, the oxygen absorption layer comprises a diene polymer (B1) containing a conjugated diene monomer as a polymerization component, and the oxygen absorption rate of the composition is 0.01 ml/m$^2$·day or more.

In a preferred embodiment, the resin composition comprises the thermoplastic resin (A) in an amount of 10 to 99.9 wt %, and the multilayered polymer particle (B) in an amount of 0.1 to 90 wt %.

In a preferred embodiment, the thermoplastic resin (A) is at least one selected from the group consisting of a polyvinyl alcohol resin (A1), a polyamide resin (A2), and a polyester resin (A3).

In a preferred embodiment, the diene polymer (B1) is at least one selected from the group consisting of a polymer having only a conjugated diene monomer as a polymerization component, and a polymer having a conjugated diene monomer and another copolymerizable vinyl monomer as polymerization components.

In a preferred embodiment, the transition metal salt (C) is at least one selected from the group consisting of iron salts, nickel salts, copper salts, manganese salts, and cobalt salts.

In a preferred embodiment, the thermoplastic resin (A) is a polyvinyl alcohol resin (A1), and the polyvinyl alcohol resin (A1) is an ethylene-vinyl alcohol copolymer having an ethylene content of 3 to 60 mol % and a degree of saponification of 90% or more.

In a preferred embodiment, a polymer constituting the multilayered polymer particle (B) contains carbon-carbon double bonds in an amount of 0.0001 eq/g or more based on the weight of the particle (B).

In a preferred embodiment, the difference in the refractive index between the thermoplastic resin (A) and the multilayered polymer particle (B) is 0.01 or less.

In a preferred embodiment, a plurality of the multilayered polymer particles (B) are dispersed in a matrix of the thermoplastic resin (A).

A third thermoplastic resin composition of the present invention comprises a multilayered polymer particle (B) and a transition metal salt (C); wherein the multilayered polymer particle (B) has at least two thermoplastic resin layers, one of which is an oxygen absorption layer made of a resin or a resin mixture containing a diene polymer (B1) having a conjugated diene monomer as a polymerization component; wherein the diene polymer (B1) contains the conjugated diene monomer as a polymerization component in an amount of 10 mol % or more, based on the total amount of the resin constituting the oxygen absorption layer; wherein the other layer does not substantially contain the diene polymer (B1), and the layer is the outermost layer of the multilayered polymer particle (B); and the transition metal salt (C) is contained in an amount of 1 to 5000 ppm in terms of a metal element thereof.

The present invention also includes a multilayered structure comprising any one of the above-mentioned thermoplastic resin compositions.

The present invention further includes a multilayered container comprising any one of the above-mentioned thermoplastic resin compositions.

The present invention further includes a multilayered film comprising any one of the above-mentioned thermoplastic resin compositions and having a total thickness of 300 μm or less.

The present invention further includes a multilayered container obtained by molding the multilayered film mentioned above.

The present invention further includes a multilayered container comprising a layer of any one of the above-mentioned thermoplastic resin compositions and a layer made of a thermoplastic polyester.

Thus, the invention described herein makes possible the advantages of: (1) providing a thermoplastic resin composition having an excellent function of absorbing oxygen that can be used in a wide range of fields including packaging materials for drinks, foods, medicines, cosmetics and the like; (2) providing a resin composition having excellent gas barrier properties, in particular against oxygen gas, in addition to the excellent function of absorbing oxygen; (3) providing a resin composition having good transparency, in addition to the excellent function of absorbing oxygen and gas barrier function; and (4) providing a multilayered structure using the composition, for example, a multilayered container.

DESCRIPTION OF THE PREFERRED EMBODIMENT

As used herein, "absorbing" or "absorption of" oxygen means absorbing and consuming oxygen from a given environment or reducing the amount of oxygen.

The thermoplastic resin (A) contained in the resin composition of the present invention is not limited to a particular type. For example, polyvinyl alcohol resin, polyamide resin, polyester resin, polyolefin resin, polystyrene resin, polyvinyl chloride resin, acrylic resin, polyvinylidene chloride, polyacetal resin, polycarbonate resin, polyurethane resin or the like can be used. The thermoplastic resin used in the present invention includes a thermoplastic elastomer. Among these, polyvinyl alcohol resin (A1), polyamide resin (A2) and polyester resin (A3) are preferable. Since such resins are excellent in gas barrier properties, if they are used, a good gas barrier function, in addition to the oxygen absorption function, can be obtained.

The polyvinyl alcohol resin (A1) is obtained by saponifying a vinyl ester homopolymer or a copolymer of vinyl ester and another monomer (especially, a copolymer of vinyl ester and ethylene) using an alkaline catalyst or the like.

As the vinyl ester, a typical compound is vinyl acetate. Other fatty vinyl esters (e.g., vinyl propionate and vinyl pivalate) can also be used.

The degree of saponification of the vinyl ester component of the polyvinyl alcohol resin is preferably 90% or more, more preferably 95% or more, even more preferably 97% or more. If the degree of saponification is less than 90%, the gas barrier properties under high humidity may be lowered. Further, when an ethylene-vinyl alcohol copolymer (EVOH) is used, the thermal stability lowers, and the resultant molded article tends to have gelled aggregates and fisheyes.

When the polyvinyl alcohol resin is a blend of at least two kinds of polyvinyl alcohol resins having different degrees of saponification, the average calculated based on the blend weight ratio is determined as the degree of saponification of the blend. The degree of saponification of the polyvinyl alcohol resin can be measured by nuclear magnetic resonance (NMR).

Among the polyvinyl alcohol resins (A1) used in the present invention, EVOH is preferable in consideration of its adaptability to melt molding and good gas barrier properties under high humidity.

The ethylene content of EVOH is preferably in the range of 5 to 60 mol %. If the ethylene content is less than 5 mol %, the gas barrier properties under high humidity lower and the melt moldability may occasionally worsen. The ethylene content of EVOH is preferably 10 mol % or more, more preferably 15 mol % or more, most preferably 20 mol % or more. If the ethylene content exceeds 60 mol %, sufficiently good gas barrier properties may not be easily obtained. The ethylene content is preferably 55 mol % or less, more preferably 50 mol % or less. The ethylene content of EVOH can be measured by NMR.

A suitable EVOH for use has an ethylene content in the range of 5 to 60 mol % and a degree of saponification of 90% or more.

When the EVOH is a blend of at least two kinds of EVOH having different ethylene contents or degrees of saponification, the average ethylene content or the average degree of saponification is calculated based on the blend weight ratio. This average value is designated as the ethylene content or the degree of saponification of the blend.

In the case of a blend of two kinds of EVOH, it is preferable that the difference in the ethylene contents between the two kinds of EVOH is 15 mol % or less and that the difference in the degree of saponification is 10% or less. If these conditions fail to be satisfied, the transparency of the resultant resin composition layer may be inadequate. In order to obtain good transparency, the difference in the ethylene content is preferably 10 mol % or less, more preferably 5 mol % or less, and the difference in the degree of saponification is preferably 7% or less, more preferably 5% or less.

A small amount of another monomer may be contained in the polyvinyl alcohol resin (A1), especially in EVOH, as a copolymerization component within the range not interfering with the purposes of the present invention. Examples of the monomer that may be a copolymerization component include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, amides, and anhydrides thereof; nitrites such as acrylonitrile and methacrylonitrile; vinylsilane compounds such as vinyltrimethoxysilane; unsaturated sulfonic acids and their salts; alkylthiols; and vinylpyrrolidones.

Among the above, when a vinylsilane compound is contained in EVOH as a copolymerization component in an amount of 0.0002 to 0.2 mol %, the consistency in melt viscosity of the EVOH with that of the base resin during coextrusion molding or coinjection molding is improved, allowing for production of a uniformly molded article. Examples of the vinylsilane compound include vinyltrimethoxysilane, vinyltriethoxysilane, vinyltri(2-methoxy-ethoxy)silane, 3-methacryloyloxypropyltrimethoxysilane. Among these, vinyltrimethoxysilane and vinyltriethoxysilane are preferable.

EVOH containing a boron compound is also effective in improving the consistency in melt viscosity of EVOH with that of the base resin during coextrusion molding or coinjection molding, allowing for production of a uniformly molded article even in a process of a long term coextrusion or coinjection molding. Examples of the boron compound include boric acids, boric acid esters, borates, and boron hydrides. Specifically, the boric acids include boric acid, orthoboric acid, metaboric acid, and tetraboric acid. The boric acid esters include triethyl borate and trimethyl borate. The borates include alkali metal salts, alkaline-earth metal salts of the boric acids, borax, and the like. Among these compounds, boric acid, orthoboric acid, and $NaBH_4$ are preferable.

The content of the boron compound, if contained, is preferably in the range of 20 to 2000 ppm, and more preferably 50 to 1000 ppm, in terms of the boron element. With the addition of boron within this range, torque variation in EVOH during melting by heating is suppressed. If the boron content is less than 20 ppm, this effect is minimal. If it exceeds 2000 ppm, gelation tends to occur resulting in poor moldability.

It is also effective in improving the layer adhesions and compatibility to add an alkali metal salt to the EVOH in an amount of 5 to 5000 ppm in terms of the alkali metal element.

The added amount of the alkali metal salt is more preferably in the range of 20 to 1000 ppm, and more preferably 30 to 500 ppm, in terms of the alkali metal element. The alkali metal in the alkali metal salt includes lithium, sodium, potassium, and the like. Examples of the alkali metal salt include aliphatic carboxylates, aromatic carboxylates, phosphates, and metal complexes of monovalent metals. Specifically, they include sodium acetate, potassium acetate, sodium phosphate, lithium phosphate, sodium stearate, potassium stearate, sodium salt of ethylenediaminetetraacetic acid, and the like. Among these, sodium acetate, potassium acetate, and sodium phosphate are most preferable.

It is also preferable to add a phosphorus compound to the EVOH in an amount of 2 to 200 ppm, more preferably 3 to 150 ppm, most preferably 5 to 100 ppm, in terms of the phosphorous element. If the concentration of phosphorus in EVOH is less than 2 ppm or exceeds 200 ppm, the melt moldability and thermal stability of the resultant composition may be lowered. In particular, problems such as generation of gelled aggregates and coloring during long-duration melt molding tend to occur.

The kind of phosphorus compound added to the EVOH is not specifically defined, but various kinds of acids such as phosphoric acid and phosphorous acid and salts thereof may be used. Phosphates may be in the form of primary phosphates, secondary phosphates, or tertiary phosphates, and the cationic species of the phosphates is not specifically defined. The phosphates are preferably alkali metal salts and alkaline-earth metal salts. Among these, it is preferable to add the phosphorus compound in the form of sodium dihydrogenphosphate, potassium dihydrogenphosphate, disodium hydrogenphosphate, or dipotassium hydrogenphosphate.

The melt flow rate (MFR) of the EVOH used in the present invention (210° C., 2160 g load; according to JIS K7210) is in the range of 0.1 to 100 g/10 min, more preferably 0.5 to 50 g/10 min, and even more preferably 1 to 30 g/10 min.

It is also possible to add to the EVOH beforehand a thermal stabilizer, an ultraviolet absorber, an antioxidant, a coloring agent, a filler, and other resins (e.g., polyamides and polyolefins) as required. EVOHs containing a boron compound, an alkali metal salt, a phosphorus compound, and the like are commercially available.

The above polyamide resin (A2) is not limited to a particular type. For example, the following polyamide resins can be used: polycaprolactam (Nylon-6), poly-ω-aminoheptanoic acid (Nylon-7), poly-ω-aminononanoic acid (Nylon-9), polyundecanamide (Nylon-11), polylaurolactam (Nylon-12), polyethylene adipamide Nylon-2,6), polytetramethylene adipamide (Nylon-4,6), polyhexamethylene adipamide (Nylon-6,6), polyhexamethylene sebacamide (Nylon-6, 10), polyhexamethylene dodecamide (Nylon-6, 12), polyoctamethylene adipamide (Nylon-8, 6), polydecamethylene adipamide (Nylon-10, 6), polydodecamethylene sebacamide (Nylon-12,10), caprolactam/laurolactam copolymer (Nylon-6/12), caprolactam/ω-aminononanoic acid copolymer (Nylon-6/9), caprolactam/hexamethylene adipamide copolymer (Nylon-6/6,6), laurolactam/hexamethylene adipamide copolymer (Nylon-12/6, 6), hexamethylene adipamide/hexamethylene sebacamide copolymer (Nylon-6,6/6,10), ethylene adipamide/hexamethylene adipamide copolymer (Nylon-2,6/6,6), caprolactam/hexamethylene adipamide/hexamethylene sebacamide copolymer (Nylon-6/6,6/6,10), polyhexamethylene isophthalamide, polyhexamethylene terephthalamide, and hexamethylene isophthalamide/hexamethylene terephthalamide copolymer. These polyamide resins can be used alone or in combinations of two or more.

The polyester resin (A3) is not limited to a particular type. Typical examples of polyester resins include poly(ethylene terephthalate), poly(butylene terephthalate), poly(ethylene terephthalate/ethylene isophthalate), and poly(ethylene terephthalate/cyclohexane dimethylene terephthalate). Furthermore, a copolymer polyester that is the above-mentioned polyester resin further containing one or more of the following comonomers as the copolymerization component can be used: diols such as ethylene glycol, butylene glycol, cyclohexan dimethanol, neopentyl glycol, pentane diol; and dicarboxylic acids such as isophthalic acid, benzophenone dicarboxylic acid, diphenyl sulfone dicarboxylic acid, diphenylmethane dicarboxylic acid, propylene bis (phenyl carboxylic acid), diphenyl oxide dicarboxylic acid, oxalic acid, malonic acid, succinic acid, glutaric acid, adipic acid, pimelic acid, suberic acid, azelaic acid, sebacic acid, and diethyl succinic acid.

The multilayered polymer particle (B) contained in the thermoplastic resin composition of the present invention has a multilayered structure (having at least two layers) mainly made of a thermoplastic resin, and at least one of the layers is an oxygen absorption layer. This oxygen absorption layer comprises a diene polymer (B1l) containing a conjugated diene monomer as a polymerization component. The diene polymer (B1) has an oxygen absorption function as described later. The multilayered polymer particle (B) generally has a layered structure referred to as core/shell, i.e., an inner layer/outer layer structure where the inner layer is covered with the outer layer, and can include at least two layers (i.e., two, three, four or more layers). Herein, "layer" also includes the core portion of the multilayered structure particle (this core portion is referred to as a core layer). "Inner layer" and "outer layer" are relative terms, and for example, in the case where the multilayered structure particle has three layers consisting of a core layer, an intermediate layer and an outermost layer, the intermediate layer is the outer layer relative to the core layer, and is the inner layer relative to the outermost layer.

The multilayered polymer particle (B) generally includes a hard layer in addition to the oxygen absorption layer. This hard layer is a resin layer having a rigidity higher than that of the oxygen absorption layer. The hard layer is provided for the purpose of retaining the shape of the particle, improving the handling properties of the particle and the like.

In the case where the multilayered polymer particle of the present invention has a two-layered structure, in general, the particle has a structure of oxygen absorption layer (core layer)/hard layer (outermost layer). In the case of a three-layered structure, in general, the particle has a structure of hard layer (core layer)/oxygen absorption layer (intermediate layer)/hard layer (outermost layer); oxygen absorption layer (core layer)/hard layer (intermediate layer)/hard layer (outermost layer); or oxygen absorption layer (core layer)/oxygen absorption layer (intermediate layer)/hard layer (outermost layer). In the case of a four-layered structure, for example, the particle has a structure of oxygen absorption layer (core layer)/hard layer (intermediate layer)/oxygen absorption layer (intermediate layer)/hard layer (outermost layer). In the case of a multilayered polymer particle having a structure of at least three layers, the polymer particle may have two or more oxygen absorption layers.

The multilayered polymer particle (B) can comprise a rubber layer in an arbitrary portion, in addition to the oxygen absorption layer and the hard layer, for the purpose of improving mechanical properties such as impact-resistance by providing flexibility to the particle, or improving its weather resistance. Furthermore, the multilayered polymer particle (B) can be provided with rubber elasticity by modifying the oxygen absorption layer or the hard layer itself, as long as it does not practically interfere with the oxygen absorption function of the particle (both cases will be described later).

In the above-described various multilayered structures, for example, the inner layer may be partially covered with the outer layer. Furthermore, in one embodiment, at least one layer in the multilayered polymer particle may have at least one small void (including microvoids, voids or cavities). In such an embodiment, the void may have at least one passage connecting to the space outside the particle.

It is preferable that the outermost layer of the multilayered polymer particle does not substantially contain the diene polymer (B1), as described later.

The "particle" as used herein has the nature that is normally possessed by the polymer particles used in polymer chemistry. Such a polymer particle is roughly described in, for example, the following literature: New development of microparticle polymer as a functional material (Toray research center); The advanced technology of super microparticle polymer (CMC, 1991); and Microparticle design (Industrial Research Institute, 1987).

The structure of the multilayered polymer particle is not limited to the above structures, and can be modified as appropriate.

The diene polymer (B1) used in the oxygen absorption layer is a polymer comprising a conjugated diene monomer as a polymerization component. Such a polymer is at least one selected from the group consisting of a polymer having only a conjugated diene monomer as the polymerization component, and a polymer having a conjugated diene monomer and another copolymerizable vinyl monomer as the polymerization components.

Since such a compound has a reactive double bond in the molecule, the compound can react with oxygen and thus has the oxygen absorption function.

Examples of the conjugated diene monomer include butadiene and isoprene. Preferable examples of the polymer having only such a monomer as the polymerization component include polybutadiene, polyisoprene, and a butadiene-isoprene copolymer.

Examples of the copolymerizable vinyl monomer contained in the polymer having a conjugated diene monomer and another copolymerizable vinyl monomer as the polymerization components include (meth)acrylates, aromatic vinyl compounds, and acrylonitrile. Among these, examples of (meth)acrylates include methyl (meth)acrylate, ethyl (meth)acrylate, propyl (meth)acrylate, butyl (meth)acrylate, amyl (meth)acrylate, hexyl (meth)acrylate, 2-ethylhexyl (meth)acrylate, cyclohexyl (meth)acrylate, octyl (meth)acrylate, decyl (meth)acrylate, dodecyl (meth)acrylate, octadecyl (meth)acrylate, phenyl (meth)acrylate, benzyl (meth)acrylate, naphthyl (meth)acrylate, and isobornyl (meth)acrylate. Examples of aromatic vinyl compounds include styrene and a -methyl styrene. The above term "(meth)acrylate" is a general term for "acrylate" and "methacrylate".

Specific examples of the polymer having a conjugated diene monomer and another copolymerizable vinyl monomer as the polymerization components include a styrene-butadiene copolymer, a styrene-isoprene copolymer, an acrylonitrile-butadiene copolymer, an acrylonitrile-isoprene copolymer, an acrylate-butadiene copolymer and an acrylate-isoprene copolymer, and these are preferably used.

The use of the polymer having a conjugated diene monomer and another copolymerizable vinyl monomer as the polymerization components as the diene polymer (B1) makes it easy to control the difference in the refractive index between the thermoplastic resin (A) and the multilayered polymer particle (B). Moreover, it makes it easy to control the reaction time in the preparation of the polymer layer of the particle. For example, in the case where the polyvinyl alcohol resin (A1) is used as the thermoplastic resin (A), a polymer comprising styrene as a copolymerization component is preferable to control the difference in the refractive index from the resin, and a polymer comprising acrylate as a copolymerization component is preferable to reduce the polymerization reaction time. A styrene-butadiene-acrylate copolymer and styrene-isoprene-acrylate copolymer are particularly preferable for the diene polymer. (B1) in view of both the control of the refractive index and the reduction of the polymerization reaction time.

In order to obtain a sufficient oxygen absorption function, the conjugated diene monomer contained in the diene polymer (B1) as a polymerization component is contained in a ratio of 10 wt % or more, preferably 20 wt % or more, and more preferably 30 wt % or more on the basis of the weight of the polymer of the entire oxygen absorption layer. The upper limit of the content of the conjugated diene monomer as a polymerization component is not limited to a particular amount, and the conjugated diene monomer can make up 100% of the amount. In other words, the oxygen absorption layer can be constituted only of the polymer containing only the conjugated diene monomer as its polymerization component. However, in view of the reduction of the difference in the refractive index between the thermoplastic resin (A) and the multilayered polymer particle (B) and the control of the reaction time in the preparation of the polymer layer, the conjugated diene monomer is contained preferably in a ratio of 90 wt % or less, more preferably 80 wt % or less. Therefore, the content of the conjugated diene monomer contained in the polymer as a polymerization component is preferably 10 to 90 wt % on the basis of the weight of the entire oxygen absorption layer.

A polymer having a glass transition temperature (Tg) higher than 25° C. is used as the polymer constituting the hard layer in the multilayered polymer particle (B), and the type thereof is not limited to a particular type. The hard layer is provided preferably as the outermost layer. Using the multilayered polymer particle (B) having the hard layer as its outermost layer provides the particle with good handling properties and good dispersibility when melt-kneaded with the thermoplastic resin (A). General examples of the polymeric monomer that can be used for forming the hard layer include methacrylates such as methyl methacrylate, ethyl methacrylate, propyl methacrylate, butyl methacrylate, amyl methacrylate, hexyl methacrylate, 2-ethylhexyl methacrylate, cyclohexyl methacrylate, octyl methacrylate, decyl methacrylate, dodecyl methacrylate, octadecyl methacrylate, phenyl methacrylate, benzyl methacrylate, naphthyl methacrylate, and isobornyl methacrylate; aromatic vinyl compounds such as styrene and α-methyl styrene; and acrylonitrile. Among these, it is preferable to use methyl methacrylate or styrene alone to form the hard layer, or to form the hard layer by combining one of these as the main component and at least one monomer listed above.

Examples of a polymer constituting the rubber layer include olefin rubber such as ethylene-propylene copolymer; acrylic rubber such as polyacrylate; organopolysiloxane; thermoplastic elastomer; and ethylene ionomer copolymer. Among these, an acrylic rubber made of polyacrylate is particularly preferable. Examples of the acrylates that can form acrylic rubber include alkyl acrylates such as methyl acrylate, ethyl acrylate, propyl acrylate, butyl acrylate, 2-ethylhexyl acrylate, and octyl acrylate. Among these, butyl acrylate or 2-ethylhexyl acrylate is preferable. This rubber layer can be provided in any position in the multilayered polymer particle (B).

Furthermore, as described above, it is possible to modify the oxygen absorption layer itself to be provided with the rubber elasticity, within the range that does not practically interfere with the oxygen absorption function. More specifically, it is preferable that the oxygen absorption layer includes a polymer having a crosslinked molecular chain structure to express the rubber elasticity, and/or it is also preferable that the polymer molecular chains included in the oxygen absorption layer and the polymer molecular chains included in the adjacent layer are grafted by chemical bonding. For this purpose, for example, in the polymerization of monomers for forming the oxygen absorption layer, it is desirable to use a small amount of polyfunctional polymeric monomer as a crosslinking agent or a graft agent.

The polyfunctional polymeric monomer is a radical polymerizable monomer having at least two carbon-carbon double bonds in the molecule, and examples thereof include an ester of an unsaturated carboxylic acid (e.g., acrylic acid, methacrylic acid, or cinnamic acid) and an unsaturated alcohol (e.g., allyl alcohol or methallyl alcohol) or a glycol (e.g., ethylene glycol or butanediol); and an ester of a dicarboxylic acid (e.g, phthalic acid, terephthalic acid, isophthalic acid or maleic acid) and the above unsaturated alcohol. Specific examples of the polyfunctional polymeric monomer include allyl acrylate, methallyl acrylate, allyl methacrylate, methallyl methacrylate, allyl cinnamate, methallyl cinnamate, diallyl maleate, diallyl phthalate, diallyl terephthalate, diallyl isophthalate, divinyl benzene, ethylene glycol di(meth)acrylate, butanediol di(meth)acrylate, and hexanediol di(meth)acrylate. The term "di(meth) acrylate" is a general term for "diacrylate" and "dimethacrylate".

The polyfunctional polymeric monomer can be used alone or in combination of a plurality of kinds. Among these, butanediol diacrylate, hexanediol diacrylate, or allyl methacrylate is preferably used. However, when the polyfunctional polymeric monomer is used, if the amount thereof is too much, the performance as rubber in the multilayered polymer particle is lowered. As a result, the impact-resistance and the oxygen absorbency of the obtained thermoplastic resin composition is lowered. The amount of the polyfunctional polymeric monomer is preferably 10 wt % or less of the entire polymeric monomer forming the oxygen absorption layer. When a polymeric monomer mixture including a conjugated diene compound as the main component is used, the diene compound itself acts as a crosslinking point or a graft point in the process of polymerization. Therefore, the oxygen absorption layer having rubber elasticity can be formed without using the polyfunctional polymeric monomer.

The proportion of the oxygen absorption layer of the entire multilayered polymer particle (B) is not limited to a particular proportion, but is preferably within the range of 20 to 95 wt %, more preferably 50 to 90 wt %. If the amount of the polymer forming the oxygen absorption layer is too small, the oxygen absorption ability of the resin composition of the present invention may be insufficient.

It is preferable that the outermost layer of the multilayered polymer particle (B) does not substantially contain the diene polymer (B1). This is because the handling properties of the multilayered polymer particle (B) and the dispersibility of the particle when melt-kneaded with the thermoplastic resin (A) are superior to those of the particles having the diene polymer in the outermost layer. More specifically, the content of the diene polymer (B1),is preferably 5 mol % or less. The outermost layer is preferably the hard layer.

The entire resin constituting the multilayered polymer particle (B) contains carbon-carbon double bonds preferably in an amount of 0.0001 eq/g or more, based on the weight of the entire resin. These carbon-carbon double bonds can be derived from the diene polymer (B1). If the content of the carbon-carbon double bonds is less than 0.0001 eq/g, the oxygen absorption rate is not sufficient, and thus the oxygen absorption effect of the composition of the present invention may be insufficient. To obtain a sufficient oxygen absorption effect, the content of the carbon-carbon double bonds is preferably 0.0005 eq/g or more, and more preferably 0.001 eq/g or more.

The carbon-carbon double bonds as used herein refer to double bonds of an aliphatic compound and the side chain of an aromatic ring, and include conjugated double bonds, but do not include multiple bonds contained in an aromatic ring.

The multilayered polymer particle (B) can contain an antioxidant, if necessary. Examples of the antioxidant include 2,5-di-t-butylhydroquinone, 2,6-di-t-butyl-p-cresol, 4,4, '-thiobis-(6-t-butylphenol), 2,2'-methylene-bis-(4-metbyl-6-t-butylphenol), octadecyl-3-(3',5'-di-t-butyl-4'-hydroxyphenyl)propionate, 4,4'-thiobis-(6-t-butylphenol), 2-t-butyl-6-(3-t-butyl-2-hydroxy-5-methylbenzyl)-4-methylphenylacrylate, and pentaerythritoltetrakis (3-laurylthiopropionate).

An optimal amount of the antioxidant to be added is determined in view of the kinds and the proportions of components of the thermoplastic resin composition, the use, the storage conditions, and the like. In general, if a large amount of antioxidant is added, reaction of the diene polymer (B1) in the multilayered polymer particle (B) with oxygen that is to be transmitted in the resin composition is blocked. This may prevent the compound of the present invention from satisfactorily exerting its oxygen absorption function. On the other hand, if no antioxidant is contained or the amount thereof is too small, the reaction with oxygen proceeds during storage or melt processing of the thermoplastic resin composition so that the oxygen absorption performance may have been lowered when it is actually put to use.

In the case where the multilayered polymer particle (B) is stored under an inactive gas atmosphere, or the resin composition is produced by melt blending at a comparatively low temperature or in a nitrogen-sealed state, the amount of the antioxidant can be small.

In the case where the resin composition of the present invention comprises an oxidation catalyst composed of a transition metal salt (C) as described later, even if the multilayered polymer particle (B) contains the antioxidant to some extent, a resin composition having good oxygen absorption ability can be obtained. The content of the antioxidant in this case is preferably 0.01 to 1 wt %, and more preferably 0.05 to 0.5 wt %. The antioxidant may be added when the multilayered polymer particle (B) is prepared, or may be added when the components of the resin composition are blended.

The method for producing the multilayered polymer particle (B) is not limited to a particular method. For example, using a regular emulsion polymerization method, a spherical multilayered polymer particle (B) can be easily obtained. For example, to obtain a two-layered structure particle having the oxygen absorption layer as the core layer and the hard layer as the outermost layer, first emulsion polymerization is performed using a monomer that can form the oxygen absorption layer. Then, a monomer that can form the hard layer is introduced into the reaction system and emulsion polymerization is performed. Thus, the intended two-layered structure particle can be obtained. In the emulsion polymerization, a chain transfer agent such as octyl mercaptan or lauryl mercaptan can be used according to known methods, if necessary. After emulsion polymerization, the multilayered polymer particle (B) can be separated from the polymer latex according to a known process, for example by solidification-drying.

The average particle size of the multilayered polymer particle (B) is not limited to a particular size, but it is preferably in the range from 0.02 to 2 µm, more preferably 0.05 to 1.0 µm. If the average particle size is too small, the production cost of the multilayered polymer particle (B) is increased. On the other hand, if it is too large, the transparency of the resin composition of the present invention may be lost.

The form of the multilayered polymer particle (B) is not limited to a particular form. For example, it can be in the form of a pellet where the particles are fused to each other in the outermost layer portion, or it can be in the form of a powder or a granule. The particles in any form can be used to produce the resin composition of the present invention.

The difference in the refractive index between the multilayered polymer particle (B) and the thermoplastic resin (A) is in particular preferably 0.01 or less in view of the transparency of the resin composition. When the difference in the refractive index between the thermoplastic resin (A) and the multilayered polymer particle (B) is more than 0.01, the transparency of the resin composition of the present invention may be poor. In order to obtain good transparency, the difference in the refractive index between the thermoplastic resin (A) and the multilayered polymer particle (B) is preferably 0.007 or less, and more preferably 0.005 or less. Herein, the refractive index of the multilayered polymer particle (B) refers to a value obtained by press-molding the multilayered polymer particle (B) at a mold temperature of 210° C. into a non-oriented film having a thickness of 20 µm, and measuring the refractive index of the film.

It is preferable that the multilayered polymer particle (B) itself has excellent transparency. It is preferable that the internal haze value of the non-oriented film having a thickness of 20 µm obtained by press-molding the multilayered polymer particle (B) at a mold temperature of 210° C. is 10% or less.

The contents of the thermoplastic resin (A) and the multilayered polymer particle (B) in the resin composition of the present invention is not limited to a particular proportion, but generally the thermoplastic resin (A) is contained in an amount of 10 to 99.9 wt %, and the multilayered polymer particle (B) is contained in an amount of 0.1 to 90 wt %. Preferably, the thermoplastic resin (A) is contained in an amount of 70 to 99 wt %, and the multilayered polymer particle (B) is contained in an amount of 1 to 30 wt %. More preferably, the thermoplastic resin (A) is contained in an amount of 80 to 98 wt %, and the multilayered polymer particle (B) is contained in an amount of 2 to 20 wt %. When the amount of the multilayered polymer particle (B) is less than 0.1 wt %, the oxygen absorption function may not be exerted sufficiently. When a gas barrier resin such as EVOH is used as the thermoplastic resin (A) for good gas barrier properties, if the gas barrier resin is contained in only a small amount, the gas barrier properties of the resin composition as a whole are poor.

Preferably, the resin composition of the present invention comprises a transition metal salt (C). If the transition metal salt (C) is contained, the content thereof is 1 to 5000 ppm, preferably 5 to 1000 ppm, and more preferably 10 to 500 ppm in terms of the metal element.

This can accelerate the oxidation reaction of the diene polymer (B1) in the multilayered polymer particle (B). For example, oxygen present inside a packaging material obtained by the composition of the present invention and oxygen that is to be transmitted in the packaging material can react with the diene polymer (B1) efficiently. As a result, the oxygen absorption function of the resin composition of the present invention can be improved. However, if the content of the transition metal salt (C) is more than 5000 ppm in terms of the metal element, the heat stability of the resin composition of the present invention is degraded, and decomposed gas, gels or seeds are generated significantly. From this point of view, it is preferable that the content of the transition metal salt (C) is in the above range.

The metal for such a transition metal salt (C) is preferably selected from the first, second, and third transition elements of the periodic table. Examples of suitable metals include, but are not limited to, manganese, iron, cobalt, nickel, copper, rhodium, titanium, chromium, vanadium, and ruthenium. Among these metals, iron, nickel, copper, manganese, and cobalt are preferable, with manganese and cobalt being more preferable, and cobalt being even more preferable.

Examples of counter ions of the metal for the transition metal salt (C) include, but are not limited to, anions derived from organic acids and chlorides. The organic acids include: acetic acid, stearic acid, acetyl acetone, dimethyldithiocarbamic acid, palmitic acid, 2-ethylhexanoic acid, neodecanoic acid, linoleic acid, tolic acid, oleic acid, resin acid, capric acid, and naphthenic acid. Especially preferred salts are cobalt 2-ethylhexanate, cobalt neodecanoate, and cobalt stearate. The metal salt may be a so-called ionomer having a polymeric counter ion.

The first thermoplastic resin composition of the present invention comprises the thermoplastic resin (A), the multilayered polymer particle (B) and the transition metal salt (C).

The second thermoplastic resin composition of the present invention comprises the thermoplastic resin (A) and the multilayered polymer particle (B), and the oxygen absorption rate of the composition is 0.01 ml/m$^2$·day or more.

The third thermoplastic resin composition of the present invention comprises the multilayered polymer particle (B) and the transition metal salt (C), and the multilayered polymer particle (B) has the specific structure described later.

In all of the above resin compositions, various additives can be added, if necessary. Examples of such additives include an antioxidant, a plasticizer, a thermal stabilizer, an ultraviolet absorber, an antistatic agent, a lubricant, a colorant, a filler, a desiccant, or other polymer compounds, and they can be blended within the range which does not interfere with the function and the effects of the present invention.

Furthermore, one or more other polymer compounds can be blended within the range which does not interfere with the function and the effects of the present invention.

In order to improve the melt stability or the like, one or more substances selected from hydrotalcite compounds and metal salts of higher aliphatic carboxylic acids (e.g., calcium stearate, magnesium stearate or the like) can be added to the resin composition of the present invention within the range which does not interfere with the function and the effects of the present invention. It is preferable that the amount thereof is 0.01 to 1 wt % with respect to the resin composition, if used.

The hydrotalcite compounds, when mixed with the resin composition of the present invention, can prevent gelled aggregates or fisheyes from being generated in the layer made of the resin composition, and thus improve the long-term operational stability.

The metal salts of higher aliphatic carboxylic acids, when mixed with the resin composition of the present invention, can prevent gelled aggregates and fisheyes from being generated, and thus further improve the long-term operational stability.

As the metal salts of higher aliphatic carboxylic acids, metal salts of higher fatty acids having 8 to 22 carbon atoms are preferable to be used. Examples of higher fatty acids having 8 to 22 carbon atoms include lauric acid, stearic acid, and myristic acid. Examples of the metals of the metal salts include sodium, potassium, magnesium, calcium, zinc, barium and aluminum. Among these, alkaline-earth metals such as magnesium, calcium and barium are preferred.

It is preferable that in the resin composition of the present invention, for example, in the first and second compositions, the multilayered polymer particles (B) and optionally the particles of the transition metal salt (C) are dispersed in the matrix of the thermoplastic resin (A), especially the thermoplastic resin having gas barrier properties. Such a resin composition and a molded article, such as a multilayered container, made of the resin composition have good oxygen absorbency and transparency. When the thermoplastic resin having gas barrier properties is used, the gas barrier properties and the oxygen absorbency of the molded article are significantly good. The dispersion state of the multilayered polymer particle (B) in the resin composition of the present invention is not necessarily limited to a particular state. Any of the following is possible: the state where the particles are uniformly dispersed while each individual particle is completely independent; the state where the particles are dispersed in the form of aggregates uniformly dispersed in the resin, wherein each of the aggregates is formed of a plurality of particles attached to each other; and the state where both of the above states are present. However, it is preferable that the dispersed particle size (the particle size of a single particle or a cluster of particles) of the multilayered polymer particle (B) is 10 $\mu$m or less. When the dispersed particle size is more than 10 $\mu$m, the area of the interface between the thermoplastic resin (A) and the multilayered polymer particle (B) becomes small, so that the performance of the absorption of oxygen gas is degraded. The average particle size of the multilayered polymer particle (B) dispersed in the matrix of the thermoplastic resin (A) is preferably 5 $\mu$m or less, more preferably 2 $\mu$m or less. Most preferably, the multilayered polymer particles (B) are uniformly dispersed in the thermoplastic resin composition in the form of a particle having a particle size of 0.03 to 1 $\mu$m.

As described above, the third thermoplastic resin composition of the present invention comprises the multilayered polymer particle (B) and the transition metal salt (C), and the multilayered polymer particle (B) has a specific structure. The multilayered polymer particle (B) has at least two thermoplastic resin layers, one of which is the oxygen absorption layer (a layer containing the diene polymer (B1) having a conjugated diene monomer as a polymerization component). The oxygen absorption layer contains the copolymerization component of the conjugated diene monomer in a ratio of 10 mol % or more. The other layer is a layer forming the outermost layer. This layer does not substantially contain the diene polymer (B1). Herein, "not substantially containing the diene polymer (B1)" means that the content of the diene polymer (B1) is 5 mol % or less.

Thus, since the outermost layer does not substantially contain the diene polymer (B1), and is generally the hard layer, the handling properties of the particles are good. Such a composition can be formed into various molded articles by mixing, for example, only the multilayered polymer particle (B) and the transition metal salt (C) and melting the mixture for molding, where the outermost layers of the multilayered polymer particles (B) bind to each other. Such molded articles can be used preferably for a film, for example. This composition can further comprise the thermoplastic resin (A).

The oxygen absorption rate of the second composition of the present invention is 0.01 ml/m$^2$·day or more. The oxygen absorption rates of the other compositions also are preferably 0.01 ml/m²·day or more. The oxygen absorption rate of the resin composition is more preferably 0.05 ml/m²·day or more, and most preferably 0.1 ml/m²·day or more. If the oxygen absorption rate is less than 0.01 ml/m²·day, the oxygen absorption effect of the molded article, such as a multilayered container molded with the resin composition of the present invention, may be insufficient.

The oxygen absorption rate is the volume of oxygen absorbed by a film of the resin composition per unit surface area in a unit period of time, when the film is left to stand in the air with a predetermined volume. A specific method for measuring the rate will be described in the examples later.

A preferable melt flow rate (MFR) (210° C., 2160 g load, according to JIS K7210) of the resin composition of the present invention is 0.1 to 100 g/10 min., more preferably 0.5 to 50 g/10 min., and even more preferably 1 to 30 g /10 min. When the melt flow rate of the resin composition of the present invention fails to fall within the range of 0.1 to 100 g /10 min, the processability in melt-molding may become poor.

The thermoplastic resin composition of the present invention can be molded into various types of molded articles depending on the use thereof.

For example, as described later, a multilayered structure including a layer made of this thermoplastic resin composition, e.g., a multilayered film or a multilayered container, can be produced. The multilayered container can be produced preferably by, for example, molding the multilayered film.

The method for mixing and molding the components of the thermoplastic resin composition of the present invention is not limited to a particular method. The components can be mixed in any order.

For example, in the case where the three components of the thermoplastic resin (A), the multilayered polymer particle (B) and the transition metal salt (C) are used and mixed to produce a molded article, the order of mixing the components is not limited to a particular order. The thermoplastic resin (A), the multilayered polymer particle (B) and the transition metal salt (C) can be mixed simultaneously. Alternatively, the multilayered polymer particle (B) and the transition metal salt (C) can be mixed, and then that mixture can be mixed with the thermoplastic resin (A). Moreover, the thermoplastic resin (A) and the transition metal salt (C) can be mixed, and then the mixture can be mixed with the multilayered polymer particle (B). Alternatively, the thermoplastic resin (A) and the multilayered polymer particle (B) can be mixed, and then the mixture can be mixed with the transition metal salt (C). Furthermore, the mixture obtained by mixing the thermoplastic resin (A) and the multilayered polymer particle (B) can be mixed with the mixture obtained by mixing the thermoplastic resin (A) and the transition metal salt (C).

The components of the resin composition of the present invention can be mixed by, for example, a ribbon blender, a high-speed mixer, a Ko-kneader, a mixing roll, an extruder, or an intensive mixer.

The components of the resin composition of the present invention can be dry-blended and subjected to melt-molding as it is. More preferably, they are kneaded by, for example, a Banbury mixer or a uniaxial or biaxial screw extruder to be pelletized for melt-molding. In order to prevent the progress of oxidation of the multilayered polymer particle (B) during blending, it is preferable to seal the hopper inlet with nitrogen gas and extrude the resin at a low temperature.

It is preferable to use an extruder with high kneading ability to allow the components to be finely and uniformly dispersed, because this can provide good oxygen absorption performance and good transparency, and can prevent gels and seeds from being generated or mixed.

Kneading is important to ensure good dispersion of the components in the resin composition. As the kneader for realizing high-level dispersion of the components, continuous kneaders such as a continuous intensive mixer and a kneading type biaxial extruder (unidirectional or bi-directional) are optimal. Batch kneaders such as a Banbury mixer, an intensive mixer, or a pressure kneader may also be used. As another continuous kneader, a device using a rotary disk having a trituration mechanism such as a stone mill, for example, the KCK Kneading Extruder from KCK Co., Ltd., may be used. Those commonly used as kneaders also include a uniaxial extruder provided with a kneading section (e.g., Dulmage and CTM) and a simple kneader such as a Brabender mixer.

Among the above, the continuous intensive mixer is most preferable for the purpose of the present invention and is available as FCM from Farrel Corp., CIM from The Japan Steel Works, Ltd., and KCM, LCM, and ACM from Kobe Steel, Ltd. In practice, a device equipped with a uniaxial extruder underneath such a kneader is preferably used for achieving kneading and extrusion palletizing simultaneously. Also used for the kneading according to the present invention is a biaxial kneading extruder equipped with a kneading disk or a kneading rotor, such as TEX from The Japan Steel Works, Ltd., ZSK from Werner & Pfleiderer Corp., TEM from Toshiba Machine Co., Ltd., and PCM from Ikegai Tekko Co, Ltd.

In the use of the above continuous kneaders, the shape of the rotor or disk plays a key role. In particular, the gap between the mixing chamber and the rotor chip or the disk chip (chip clearance) is important: Being too narrow or too wide fails to provide a composition with good dispersion. The optimal chip clearance is in the range of 1 to 5 mm.

The rotational speed of the rotor of the kneader lies in the range of 100 to 1200 rpm, preferably 150 to 1000 rpm, more preferably 200 to 800 rpm. The inner diameter (D) of the chamber of the kneader is, for example, 30 mm or more, preferably in the range of 50 to 400 mm. The ratio (L/D) of the length (L) to the diameter (D) of the kneader is preferably in the range of 4 to 30. A single kneader may be used, or two or more kneaders may be used by coupling.

A longer kneading period provides better results. However, considering the prevention of oxidation of the thermoplastic resin (A) and the cost, the kneading time may be in the range of 10 to 600 seconds, preferably 15 to 200 seconds, most preferably 15 to 150 seconds.

The resin composition of the present invention can be molded into films, sheets, and other packaging materials such as containers or the like by various molding methods.

For example, the resin composition of the present invention can be molded into films, sheets, pipes and the like by melt extrusion molding, into containers by injection molding and into bottle-like hollow containers by blow molding. Blow molding includes extrusion blow molding where a parison is formed by extrusion molding and blown for molding, and injection blow molding where a preform is formed by injection molding and blown for molding.

In the present invention, the molded article produced by any of the above-described molding methods may be composed of a single layer, but it is more preferable that the molded article is in the form of a laminate (multilayered structure) with a layer or layers made of other various resins, because multiple functions can be provided. When the resin composition of the present invention is used in the form of a single layer, the oxygen absorbency may be lowered due to the moisture contained in the content or the external atmosphere. In addition, the mechanical strength may be insufficient. To compensate for these disadvantages, it is preferable to laminate a layer with water vapor barrier properties on the side where a large amount of moisture is present, or to laminate a layer having high mechanical strength.

Furthermore, in the present invention, the multilayered structure is also preferable because covering the outside of the resin composition layer with another resin layer can reduce the rate of oxygen permeating from the outside and can maintain the oxygen absorption function of the resin composition for a long time.

It may be more effective that the innermost layer of the container is formed of the resin composition, because the oxygen in the container can be absorbed swiftly.

Specific examples of the multilayered structure include structures of X/Y, X/Y/X, X/Z/Y, X/Z/Y/Z/X, X/Y/X/Y/X, and X/Z/Y/Z/X/Z/Y/Z/X, where X denotes a layer made of a resin other than the resin composition of the present invention, Y denotes the resin composition layer, and Z denotes an adhesive resin layer. The structure is not limited to these structures, and any additional layer or layers can be appropriately provided. In the case of the structure including a plurality of layers made of another resin, such layers may be made of the same kind of resin or of different kinds of resin. A recovered resin layer made of scraps generated by trimming during molding may be additionally formed, or such recovered resin may be blended in a layer made of another resin. The thickness of the layers of the multilayered structure is not limited to a particular thickness. However, the ratio of the thickness of the resin composition layer to the total thickness of all the layers is preferably 2 to 20%, in view of the moldability, the cost or the like.

A thermoplastic resin is preferable as a material for the layer of the other resin that is laminated with the resin composition of the present invention in view of the processability or the like. Examples of such a thermoplastic resin include but are not limited to: polyolefins such as ethylene homopolymer and ethylene copolymers, propylene homopolymer and propylene copolymers, poly4-methylpentene-1, and polybutene-1; polyesters such as polyethylene terephthalate, polybutylene terephthalate, and polyethylene naphthalate; polyamides such as poly ε-caprolactam, polyhexamethylene adipamide, and polymetaxylylene adipamide; polyvinylidene chloride, polyvinyl chloride, polystyrene, polyacrylonitrile, polycarbonate, and polyacrylate. A layer (film) made of such a thermoplastic resin is a non-oriented layer (film) or a layer (film) subjected to uniaxial or biaxial drawing or rolling.

Among these thermoplastic resins, polyolefins are preferable because of their excellent moisture-resistance, mechanical properties, economy, heat sealing properties and the like. Polyester has good transparency and excellent mechanical properties, and thus it is significantly useful to laminate it with the resin composition of the present invention that also has good transparency.

An adhesive resin may be used for adhesion of the resin composition layer of the present invention and the layer of other resin. The adhesive resin is not limited to a particular adhesive, as long as it can bond the layers. However, preferably used are polyurethane or polyester one-component or two-component curing adhesives, and carboxylic acid-modified polyolefin resin. The carboxylic acid-modified polyolefin resin is an olefin polymer or copolymer containing unsaturated carboxylic acids or anhydrides thereof (e.g., maleic anhydride) as a copolymerization component; or a graft copolymer obtained by grafting unsaturated carboxylic acids or anhydrides thereof to an olefin polymer or copolymer.

Among these, it is more preferable that the adhesive resin is a carboxylic acid-modified polyolefin resin in view of the adhesion between, for example, the surface layer made of polyolefin and the resin composition layer. Examples of the carboxylic acid-modified polyolefin resin include a resin obtained by carboxylic acid modification of polyethylene (low density polyethylene (LDPE), linear low density polyethylene (LLDPE), or very low density polyethylene (VLDPE)), polypropylene, copolymerized polypropylene, an ethylene-vinyl acetate copolymer, and ethylene-(meth) acrylate (for example, methyl acrylate and ethyl acrylate) copolymer.

Examples of the method for producing the multilayered structure include, but are not limited to, extrusion lamination, dry lamination, coinjection molding and coextrusion molding. The coextrusion molding includes coextrusion lamination, coextrusion sheet molding, the coextrusion inflation process, and coextrusion blow molding.

The sheet, film, parison and the like of the multilayered structure produced by any of the above methods may further be reheated at a temperature below the melting point of the contained resin and stretched uniaxially or biaxially by thermoforming such as draw forming, rolling, pantographic drawing, tubular film drawing or blow molding, so that stretched molded products can be obtained.

The transparency of the resin composition of the present invention can be improved by suitably selecting the kinds of the resins for the thermoplastic resin (A) and the multilayered polymer particle (B) in view of the refractive index. Therefore, the selection of a resin having excellent transparency as the layer of other resin to be laminated can provide a packaging container that allows its content to be clearly visible. If a multilayered structure having excellent transparency is desired, it is preferable to achieve an internal haze of 10% or less, more preferably 5% or less, and even more preferably 3% or less.

The molded articles such as containers using the resin composition of the present invention, especially the multilayered structure, can be used in various applications. In particular, when the resin composition of the present invention is used as various packaging containers, the advantages provided by the resin composition of excellent oxygen absorbency and gas barrier properties resulting from suitable selection of the thermoplastic resin (A) are significantly prominent. The resin composition of the present invention is suitable for packaging containers for materials that are susceptible to degradation in the presence of oxygen, such as foods, medicines and agricultural chemicals.

The resin composition of the present invention is also suitable for a packaging container that allows its content to be clearly visible, because good transparency can be obtained by appropriately selecting the resin. For example, the following two embodiments of packaging containers have a strict requirement for transparency and thus particularly receive a benefit from the resin composition of the present invention.

One embodiment is a container composed of a multilayered film having a total thickness of 300 μm or less and including a layer made of the resin composition of the present invention. The other embodiment is a multilayered container including a layer made of the resin composition of the present invention and a thermoplastic polyester layer. These containers will be described below in this order.

The container composed of a multilayered film having a total thickness of 300 μm or less and including a layer made of the resin composition of the present invention is a flexible container composed of a multilayered structure having a relatively small total thickness and generally is processed into the form of a pouch or the like.

In general, for a container that requires good transparency, the thickness of each of the resins constituting the multilayered structure is small so that a thin container as a whole can be produced. For example, in the case where crystalline resin such as polyolefin is used, if the thickness is large, the transparency tends to be poor due to scattering in the crystal. On the other hand, if the thickness of the container is small, good transparency can be obtained. In general, a non-oriented crystallized resin exhibits poor transparency, whereas an oriented crystallized resin exhibits good transparency. Such a uniaxial or biaxial oriented film is generally thin. Also from this point of view, a thin multilayered structure tends to exhibit good transparency.

The resin composition of the present invention exhibits very good transparency by selecting appropriate resin. Therefore, the resin composition of the present invention can be used suitably as a container composed of a thin multilayered film for which transparency is often required. Even if the transparency of such a thin film deteriorates over time, the extent of the deterioration is small.

The thickness of such a multilayered film is not limited to a particular thickness, but is preferably 300 μm or less, more preferably 250 μm or less, and even more preferably 200 μm or less, to retain the good transparency. The lower limit of the thickness is not limited to a particular value, but the thickness is preferably 10 μm or more, more preferably 20 μm or more, and even more preferably 30 μm or more, in view of the mechanical strength as a container.

The layer structure is not limited to a particular structure. A multilayered film can be formed by laminating the resin composition layer of the present invention and another thermoplastic resin layer by techniques such as dry lamination or coextrusion lamination.

In the case of dry lamination, non-oriented films, uniaxial oriented films, biaxial oriented films, and rolled films can be used. Among these, a biaxial oriented polypropylene film, a biaxial oriented polyethylene terephthalate film and a biaxial oriented poly ε-caprolactam film are suitable because of their strength and transparency. The biaxial oriented polypropylene film is most preferable because of good moisture-resistance.

In order to seal a packaging container, it is preferable to form a layer made of a heat-sealable resin on at least one outer surface of the multilayered film to be formed into this packaging container. Polyolefin such as polyethylene and polypropylene may be used as such a heat-sealable resin.

The laminated film may further be re-heated and stretched uniaxially or biaxially by thermoforming (e.g., draw forming), rolling, pantographic drawing, or tubular film drawing, so that an oriented multilayered film can be formed.

The thus obtained multilayered film can be processed into a bag shape and thus a packaging container to be filled with a material is obtained. Such a packaging container is flexible and convenient, and has good transparency and oxygen absorbency, so that it is significantly useful for packaging of materials that are susceptible to degradation by the presence of oxygen, especially for foods or the like.

The multilayered container comprising the layer made of the resin composition of the present invention and the thermoplastic polyester layer has excellent oxygen absorbency, and furthermore has good transparency and excellent gas barrier properties by suitably selecting the resin.

In general, polyester resin has good transparency, so that laminating it with the resin composition of the present invention can provide a multilayered structure having good transparency.

The form of the multilayered container including the layer of the resin composition of the present invention and the thermoplastic polyester layer is not limited to a particular form, and may be a bag-shaped container, a cup-shaped container, or a hollow molded container. Among these, the hollow molded container is important. A method for producing the hollow molded container is not limited to a particular method, and it can be produced by blow molding, injection molding or the like. However, in practice, blow molding is important and a bottle-shaped container formed by blow molding is especially important.

Blow-molded bottles made of a thermoplastic polyester resin are broadly used as containers for drinks at present. For this use, such bottles are required to satisfy the conditions in that the contents, i.e., a drink, is prevented from degradation and that it is clearly visible by the consumer. Moreover, when oxygen-sensitive drinks such as beer that easily degrade in flavor are to be packaged, the bottles are required to have significantly high gas barrier properties and oxygen absorption performance. However, it is not easy to satisfy these requirements.

The blow-molded multilayered bottle comprising the layer of the resin composition of the present invention and the thermoplastic polyester layer is most suitable for the above use because of its advantages of keeping the quality of the content from degrading while retaining the transparency.

As the polyester resin used for the multilayered container of the present invention including the layer made of the thermoplastic resin composition and the layer of the thermoplastic polyester resin, condensation polymers including aromatic dicarboxylic acids or alkyl esters thereof and diols as main components are used. In particular, polyester resins including ethylene terephthalate as a main component are preferable in attaining the purpose of the present invention. In general, the polyester resin used in the present invention includes a terephthalic acid unit and an ethylene glycol unit so that the total proportion (mol %) of these units is preferably 70 mol % or more, and more preferably 90 mol % or more, of the total moles of all the structural units of the polyester. If the total proportion is less than 70 mol %, the resultant polyester is amorphous, whereby the polyester resin greatly contracts when it is hot-filled in a container for drawing. This polyester resin is poor in thermal resistance and strength. Moreover, in the process of producing the resin, the softened resin tends to stick during solid-phase polymerization carried out to reduce oligomers contained in the resin, whereby production is made with difficulty.

The above polyester resin may contain a bifunctional compound unit other than the terephthalic acid unit and the ethylene glycol unit as required within the range not greatly interfering with the processability, strength, thermal resistance, and the like of the resin. The proportion (mol %)

of such a bifunctional compound unit is preferably 30 mol % or less, more preferably 20 mol % or less, and even more preferably 10 mol % or less, of the total moles of all the structural units of the polyester.

A preferred bifunctional compound unit allowed to be contained in the resin is at least one selected from a dicarboxylic acid unit, a diol unit, and a hydroxycarboxylic acid unit. Such bifunctional compound units may be either aliphatic, ahcyclic, or aromatic bifunctional compound units.

In view of processability and transparency, the thermoplastic polyester may preferably include an ethylene terephthalate component as a main component and have a melting point of 240 to 250° C.

If the melting point exceeds 250° C., the crystallization rate of the polyester resin is high, and thus the crystallization of the heated and melted polyester is facilitated during injection molding and blow molding. The resulting bottles are likely to generate whitening and may be poor in transparency. The degree of orientation by drawing may also be lowered, and an intended shape for molded bottles may not be obtained. This narrows the range of conditions under which good products can be produced, which tends to increase the defective production rate of products. The melting point is more preferably 248° C. or less.

If the melting point is less than 240° C., the thermal resistance of the multilayered container lowers. The crystallinity of the polyester resin also lowers below the required level, thereby lowering the degree of orientation by drawing and the mechanical strength of the polyester resin. In addition, due to the decrease in the melting point, the solid-phase polymerization temperature must be lowered in the process of producing the resin. This lowers the reaction rate and thus disadvantageously lowers the productivity of the resin. The melting point is more preferably 242° C. or more and most preferably 244° C. or more.

In order to obtain the polyester resin having a melting point within the above range, the polyester resin, including an ethylene terephthalate component as a main component, should further contain an appropriate amount of a copolymerized component. Specifically, the polyester resin preferably contains a copolymerized component in an amount of 1 to 6 mol %, more preferably 1.5 to 5 mol %, most preferably 2 to 4 mol %, of the total mole amount of all the structural units of the polyester.

The polyester resin having the copolymerized component within the above range can be obtained by the addition of comonomer to the production system of polyethylene terephthalate considering the amount of diethylene glycol to be included in the resin, the diethylene glycol being produced as a by-product during the production. Such a comonomer is not specifically defined, but the monomers mentioned above as the bifunctional units may be used. Among those, neopentyl glycol, cyclohexanedimethanol, cyclohexanedicarboxylic acid, isophthalic acid, and naphthalenedicarboxylic acid are preferable.

Among the above monomers, isophthalic acid is advantageous since the resultant copolymerized polyester provides a broad range of conditions under which good products can be produced. This results in good processability and thus a lowered defective production rate. This monomer is also advantageous in that the molded article is prevented from whitening caused by a suppressed crystallization rate.

Also preferable are a 1,4-cyclohexanedimethanol unit and 1,4-cyclohexanedicarboxylic acid as the resultant molded article has good impact strength against dropping.

Naphthalene dicarboxylic acid is also preferable in that the resultant polyester has a high glass transition temperature and thus the container as the final product has an improved thermal resistance. Further, the polyester containing naphthalenedicarboxylic acid as the copolymerization component can absorb ultraviolet radiation. This is especially useful when the content is susceptible to degradation by ultraviolet radiation. For example, this is useful when the content is, for example, beer which is susceptible to degradation by both oxidation and ultraviolet radiation.

When the container produced by coinjection stretch blow molding is used for protecting the contents from ultraviolet radiation, the thermoplastic polyester resin preferably contains a 2,6-naphthalenedicarboxylic acid component in an amount of 0.5 to 15 mol %, more preferably 1.0 to 10 mol %, with respect to the entire dicarboxylic acid component.

In the case of using a polycondensation catalyst during the production of the polyester resin, a catalyst normally used in such an occasion may be used. Examples of such a catalyst include: antimony compounds such as antimony trioxide; germanium compounds such as germanium dioxide, germanium tetraethoxide, and germanium tetra n-butoxide; titanium compounds such as titanium methoxide, titanium ethoxide, titanium n-propoxide, titanium isopropoxide, and titanium butoxide; and tin compounds such as di-n-butyltin dilaurate, di-n-butyltin oxide, and dibutyltin diacetate. These catalyst compounds may be used individually or in combinations of two or more. Among these polycondensation catalysts, germanium compounds are preferable in that the resultant polyester has a good color tone, while antimony compounds are preferable in view of the cost of the catalyst. Among the germanium compounds, germanium dioxide is especially preferable. Among the antimony compounds, antimony trioxide is especially preferable. The polycondensation catalyst is preferably added in an amount of 0.002 to 0.8 parts by weight with respect to 100 parts by weight of dicarboxylic acid.

In the light of moldability, the germanium compounds are more preferably used than the antimony compounds. More precisely, the crystallization rate of the polyester obtained by polymerization using an antimony compound is generally greater than the case using a germanium compound. This means that in the case of using an antimony compound, crystallization tends to proceed easily by heating during injection molding or blow molding. The resultant bottles are likely to generate whitening and may be poor in transparency. The degree of orientation by drawing may also be lowered, and an intended shape for molded bottles may not be obtained. This narrows the range of conditions under which good products can be produced, which tends to increase the rate of production of defective products.

In the case where the polyethylene terephthalate used contains no copolymerized component except for diethylene glycol as a by-product, the crystallization rate is higher as compared with the case where the polyethylene terephthalate is slightly modified with another copolymerized component. In the former case, therefore, the selection of the catalyst is especially important. As mentioned above, a germanium compound is preferably used as the catalyst.

The production method of the polyester resin used for the thermoplastic polyester layer of the multilayered blow bottle is not specifically defined. The polyester resin can be produced by a normal method using diol, dicarboxylic acid, the polymerization catalyst, and the like described above.

The production of a bottle container as the multilayered container having the thermoplastic polyester layer will be described.

The method for producing such a container is not specifically defined, but coinjection blow molding is preferred in light of productivity. In coinjection blow molding, a multilayered container precursor (parnson) is formed generally by a molding machine equipped with two injection cylinders. In the molding machine, the single mold is at first clamped, and a molten polyester resin (PES) and a molten oxygen absorption resin composition of the present invention are injected into the mold from respective injection cylinders alternately at non-synchronized timings or simultaneously through concentric nozzles, or by a combined manner. The coinjection in that manner gives the intended multilayered parison. Concretely, for example, one of the following methods can be employed: (1) PES for the inner and outer layers is first injected, and then the resin composition for the sandwiched layer is injected simultaneously with the injection of PES to form the sandwiched layer simultaneously with the formation of the inner and outer layers, giving a three-layered container of PES/resin composition/PES; and (2) PES for the inner and outer layers is first injected, then the resin composition is injected simultaneously with the injection of PES to form a layer between the PES inner and outer layers simultaneously with the formation of the inner and outer layers, and at the same time or thereafter PES for the core layer is injected simultaneously with the injection of the above PES and the resin composition to form the core layer simultaneously with the formation of the above layers, giving a five-layered container of PES/resin composition/PES/resin composition/PES. In that way, bottomed parisons in which the resin composition layer is completely sealed with the PES layers are obtained. These methods are ordinary ones for producing bottomed palisons, and do not require any specialized equipment. An adhesive resin layer may be interposed between the PES layer and the resin composition layer as required.

Regarding the conditions for injection molding to give the bottomed parisons, PES is desirably injected at a temperature in the range of 250 to 330° C., more preferably 270 to 320° C., even more preferably 280 to 310° C. If the injection temperature for PES is lower than 250° C., the PES pellets are not satisfactorily melted, and the resulting molded articles will have non-molten PES pellets (fisheyes), by which their appearance is worsened. In addition, the existing non-molten PES pellets lower the mechanical strength of the molded articles. In some extreme cases, the screw torque for the PES injection will increase, whereby the molding machine will have operational malfunctions. If the injection temperature for PES exceeds 330° C., PES will be highly decomposed, leading to a lowered molecular weight, whereby the mechanical strength of the molded articles will be lowered. In addition, the PES decomposition gives off some vapors of acetaldehyde and the like, by which the properties of the contents to be filled in the molded articles (e.g., bottles) will be worsened. Moreover, the oligomers resulting from the PES decomposition will greatly contaminate the mold, and the resultant molded articles will have a bad appearance.

The thermoplastic resin composition of the present invention is desirably injected at a temperature in the range of 170 to 250° C., more preferably 180 to 240° C., even more preferably 190 to 230° C. If the injection temperature for the resin composition is lower than 170° C., the pellets of the resin composition are not satisfactorily melted, and the resulting molded articles will have non-molten fragments of pellets (fisheyes), by which their appearance is worsened. In some extreme cases, the screw torque for the injection of the resin composition will increase, whereby the molding machine will have operational malfunctions. If the injection temperature for the resin composition exceeds 250° C., oxidation of the diene polymer (B1) in the multilayered polymer particles (B) will proceed to lower the oxygen absorption performance of the diene polymer (B1), whereby the oxygen absorption performance of the resin composition will tend to be lowered. In addition, the molded articles will be unfavorably colored and contain gelled materials, whereby the appearance of the resulting molded articles will be poor. Moreover, the flow of the resin composition being injected will be disordered or blocked by vapors generated through decomposition of the resin composition and by the gelled materials, whereby the layer of the resin composition will have failed areas. In some extreme cases, the gelled materials will make it impossible to continue the injection molding operation. In order to suppress the progress of the oxidation of the composition during melting, the supply hopper may preferably be sealed with nitrogen.

The resin composition of the present invention may be first formed into pellets by melt-blending the thermoplastic resin (A), the multilayered polymer particles (B), and optionally, the transition metal salt (C) and the like, and then the pellets may be supplied to the molding machine. Alternatively, the respective materials may be dry-blended, and then the dry blend may be fed to the molding machine.

The temperature of the hot runner parts through which PES and the resin composition run to be injected into the mold is desirably in the range of 220 to 300° C., more preferably 240 to 280° C., even more preferably 250 to 270° C.

If the temperature of the hot runner parts is lower than 220° C., PES will crystallize and solidify in the hot runner parts. If so, the molding operation will become difficult. If the temperature of the hot runner parts exceeds 300° C., oxidation of the multilayered polymer particles (B) will proceed to lower the oxygen absorption performance of the resin composition. In addition, the molded articles will be unfavorably colored and contain gelled materials, whereby the appearance of the resulting molded articles will be poor. Moreover, the flow of the resin composition being injected will be blocked by vapors generated through decomposition of the resin composition and by the gelled materials, whereby the layer of the resin composition will have failed areas. In some extreme cases, the gelled materials will make it impossible to continue the injection molding operation.

In order to ensure good delamination resistance and transparency of the multilayered containers to be obtained from the bottomed parisons through stretch blow molding, it is important that the crystallization of PES and the thermoplastic resin (A) is minimized as much as possible in the above injection molding stage. In that condition, the parisons can be uniformly stretched into molded articles having good delamination resistance, transparency, and shape retentivity. In order to minimize the crystallization of PES and the thermoplastic resin (A) in the parisons, the mold temperature desirably falls in the range of 0 to 70° C., more preferably 5 to 50° C., even more preferably 10 to 30° C. If the mold temperature is lower than 0° C., the dew formed around the mold will worsen the appearance of the parisons, from which good molded articles will not be obtained. If the mold temperature exceeds 70° C., the crystallization of PES and the thermoplastic resin (A) will be promoted. As a result, the parisons will fail to be uniformly stretched, and the delamination resistance of the molded articles to be obtained from them through stretch blow molding will be low. In addition, it is difficult to obtain molded articles of the intended shape. Moreover, the PES crystallization lowers the transparency of the molded articles.

The total thickness of the parison is preferably in the range of 2 to 5 mm, and the thickness of the thermoplastic resin composition layers is preferably in the range of 10 to 500 μm in total.

The thus-produced multilayered parison is directly in its high-temperature state, or after having been re-heated to the temperature in the range of 75 to 150° C. with a heating means such as a block heater, an infrared heater, or the like, transferred to the next stretch blowing stage. In the stretch blowing stage, the parison is stretched one- to five-fold in the machine direction, and thereafter blown one- to four-fold with compressed air or the like into a multilayered stretch-blown polyester container with the layers of PES and the oxygen absorption resin composition being uniaxially or biaxially oriented.

In the above stage, if the temperature at which the multilayered parison is heated is too high, the polyester will easily crystallize, whereby the stretch-blown container is whitened and its appearance becomes poor. In addition, the delamination of the stretch-blown container will increase unfavorably. If the temperature at which the multilayered parison is heated is too low, the polyester will be crazed to be pearly, whereby the transparency of the resulting container will be lowered. For these reasons, the temperature of the multilayered parison being heated preferably falls in the range of 85 to 140° C., more preferably 90 to 130° C., even more preferably 95 to 120° C.

The total thickness of the body part of the stretch-blown container of the present invention generally falls in the range of 100 to 2000 μm, preferably 150 to 1000 μm, and may vary depending on the use of the container. In that part of the container, the total thickness of the oxygen absorption resin composition layer is preferably in the range of 2 to 200 μm, more preferably 5 to 100 μm.

Thus, the multilayered containers including the layer of the thermoplastic resin composition of the present invention and the thermoplastic polyester resin layer are obtained. The containers have excellent oxygen absorption properties. Furthermore, the containers can be produced to have good transparency and also have excellent gas barrier properties by appropriately preparing the compositions for the containers. The containers are therefore suitable for packaging materials susceptible to degradation in the presence of oxygen, such as foods and medicines. Especially, they can be used most suitably as containers for drinks such as beer.

Furthermore, using the resin composition of the present invention makes it possible to prepare a container composed of a multilayered film having a total thickness of 300 μm or less, or a multilayered container where the resin composition of the present invention is laminated with the thermoplastic polyester layer, and that has gas barrier properties and oxygen absorbency, and excellent transparency. Thus, the advantage of using the resin composition of the present invention is significantly large.

EXAMPLES

Hereinafter, the present invention will be described by way of examples, but is not limited thereto. In the examples, analysis and evaluation were performed as follows.

(1) Ethylene Content and the Degree of Saponification of the Polyvinyl Alcohol Resin (A1):

The ethylene content and the degree of saponification of polyvinyl alcohol resin (A1) were calculated based on $^1$H-NMR (nuclear magnetic resonance) spectrum measured using a deuterated dimethyl sulfoxide as a solvent (by "JNM-GX-500 Model" manufactured by JEOL Ltd.).

(2) Content of Carbon-carbon Double Bonds of the Multi-layered Polymer Particle (B):

The content of the carbon-carbon double bonds of the multilayered polymer particle (B) was calculated based on $^1$H-NMR (nuclear magnetic resonance) spectrum measured using a deuterated chloroform as a solvent (by "JNM-GX-500 Model" manufactured by JEOL Ltd.). The content of carbon-carbon double bonds was obtained by calculating the molar amount (eq/g) of the double bonds contained in 1 g of the multilayered polymer particles (B).

(3) Contents of Structural Units of Polyester:

The contents of respective structural units of polyester were calculated based on $^1$H-NMR (nuclear magnetic resonance) spectrum measured using deuterated trifluoroacetic acid as a solvent (by "JNM-GX-500 Model" manufactured by JEOL Ltd.).

(4) Content of Phosphoric Acid Radicals in Polyvinyl Alcohol Resin (A1):

The content of phosphoric acid radicals was obtained as the content of phosphoric acid ions ($PO_4^{3-}$) by the following method. First, 10 g of a dry sample of the polyvinyl alcohol resin (A1) was put into 50 ml of 0.01 N hydrochloric acid, and the mixture was stirred at 95° C. for 6 hours. The resultant aqueous solution was quantitatively analyzed through ion chromatography to determine the phosphoric acid ion content. As the column of the chromatography, CIS-A23 manufactured by Yokogawa Electric Corp. was used. As the eluent, an aqueous solution containing 2.5 mM sodium carbonate and 1.0 mM sodium hydrogencarbonate was used. The quantification was based on the calibration curve of aqueous solutions of phosphoric acid.

(5) Content of Na, K, and Mg Ions in the Polyvinyl Alcohol Resin (A1):

First, 10 g of sample dry chips were put into 50 ml of 0.01 N hydrochloric acid, and the mixture was stirred at 95° C. for 6 hours. The resultant aqueous solution was quantitatively analyzed through ion chromatography to determine the Na, K and Mg ion contents. As the column of the chromatography, ICS-C25 manufactured by Yokogawa Electric Corp. was used. As the eluent, an aqueous solution containing 5.0 mM tartaric acid and 1.0 mM 2,6-pyridinedicarboxylic acid was used. The quantification was based on the calibration curves of aqueous solutions of sodium chloride, potassium chloride, and magnesium chloride, respectively. From the thus-obtained Na ion, K ion, and Mg ion contents, the alkali metal salt content and the alkaline-earth metal content in the dry chips in terms of the metal element were obtained.

(6) Limiting Viscosity of Polyester:

A sample film layer was taken out of the polyester layer of the body part of a multilayered container and dissolved in a 1/1 (by weight) mixed solvent of phenol and tetrachloroethane. The viscosity of the resultant solution was measured at 30 ° C. using an Ubbelohde's viscometer (HRK-3 Model from Hayashi Seisakusho).

(7) Glass Transition Temperature and Melting Point of Polyester:

A sample film layer was taken out of the polyester layer of the body part of a multilayered container, and the measurement was carried out according to JIS K7121 by differential scanning calorimetry (DSC) using a differential scanning calorimeter (DSC) RDC220/SSC5200H Model (manufactured by Seiko Electronics Industry). Precisely, the sample was kept at 280° C. for 5 minutes, cooled to 30° C. at a cooling rate of 100° C./min, kept at the temperature for 5 minutes, and then heated at a heating rate of 10° C./min. Through the above heat cycle, the glass transition temperature and the melting point were obtained. For temperature calibration, indium and lead were used. The glass transition temperature as referred to herein indicates the midway glass transition temperature (Tmg) according to JIS K7121, and the melting point as referred to herein indicates the melting peak temperature (Tpm) according to the same.

(8) Melt Flow Rate:

This was measured using a melt indexer, L244 (manufactured by Takara Industry). More specifically, chips of resin to be measured were put into a cylinder having an inner diameter of 9.55 mm and a length of 162 mm, and were molten therein at 210° C. A load was uniformly applied to the molten resin with a plunger having a weight of 2,160 g and a diameter of 9.48 mm, by which the resin was extruded out of the cylinder through an orifice at its center having a diameter of 2.1 mm. The flow rate (g/10 min) of the resin being extruded, i.e., the melt flow rate, was measured.

(9) Refractive Index of Resin:

The thermoplastic resin (A) or the multilayered polymer particle (B) was press-molded into a non-oriented film having a thickness of 201 μm. The refractive index of the obtained film was measured using an Abbe refractometer (4T Model manufactured by Atago Co., Ltd., SL-Na-1 Lamp manufactured by Toshiba Corp.).

(10) Haze Value:

The multilayered polymer particle (B) or the resin composition was press-molded into a non-oriented film having a thickness of 20 μm. The internal haze value of the obtained film was measured using a Poic integrating-sphere light transmittance/complete light reflectance meter (HR- 100 Model manufactured by Murakami Color Technology Laboratories) according to ASTM D1003-61. Multilayered films were also subjected to the above measurement.

As for multilayered bottles, the body of the bottle was divided into four portions along the circumference at its center. The internal haze values of the respective four portions were measured and averaged to determine the resulting mean value as the haze value of the bottle.

(11) Oxygen Absorption Rate:

The resin composition was subjected to extrusion molding into films having a thickness of 20 μm. A 0.9 m$^2$ area (0.2 m×4.5 m; surface area of 1.8 m$^2$) of the obtained single-layer film was wound to a roll shape 5 hours after the film formation and put into a 375 ml Erlenmeyer flask filled with air of 20° C. and 65%RH. The air in the Erlenmeyer flask contained oxygen and nitrogen at a volume ratio of 21:79. The opening of the Erlenmeyer flask was sealed with a multilayered sheet including an aluminum layer using an epoxy resin, and left to stand at 20° C. The air inside the container was sampled with a syringe 48 hours, 96 hours, and 192 hours after the sealing, to measure the oxygen concentration of the air by gas chromatography. The small hole formed through the multilayered sheet during measurement was sealed with the epoxy resin every time the hole was formed. The oxygen decrease amount (oxygen absorption amount) was calculated from the volume ratio of oxygen to nitrogen in the air as measured by gas chromatography. The oxygen absorption rate (ml/m$^2$·day) of the resin composition was calculated by dividing the oxygen decrease amount for 6 days from 2 days to 8 days after the sealing by the number of days and the surface area.

(12) Oxygen Transmission Amount of a Multilayered Container:

The oxygen transmission amount of a molded bottle was measured 10 days after the molding by the following process. The bottle was stored for 10 days in a nitrogen atmosphere of 20° C. –65%RH for the outside of the bottle and 20° C. –100%RH for the inside thereof. Then, the oxygen transmission amount (ml/container ·day ·atm) per container 10 days after molding was measured by an oxygen transmission amount measurement device (OX-TRAN-10/50A manufactured by Modern Control Corp.).

Synthesis Example 1

Production Example of the Multilayered Polymer Particle (B-a)

Into an autoclave, 200 parts by weight of distilled water, 4.0 parts by weight of sodium oleate as an emulsifier, 0.267 parts by weight of Rongalit (sodium formaldehydesulfoxylate), 0.13 parts by weight of disodium ethylenediaminetetraacetate and 0.008 parts by weight of ferrous sulfate 7H$_2$O were fed and heated to 50° C. under stirring while substituting the atmosphere with nitrogen. Thirty minutes later, as monomers for forming the core layer, 33.1 parts by weight of styrene, 7.4 parts by weight of butyl acrylate, and 29.5 parts by weight of butadiene were added thereto, and stirring was continued for a further 30 minutes while maintaining this temperature. Then, at the same temperature, 0.1 parts by weight of cumene hydroperoxide was added thereto to initiate the first polymerization. Four hours later, it was confirmed by gas chromatography that all the monomers were consumed. Thus, a polymer latex was obtained.

Then, the obtained polymer latex was transferred to a polymerization vessel equipped with a stirring blade, a cooling tube, and a dropping funnel under a nitrogen atmosphere and heated to 70° C. Furthermore, 0.1 parts by weight of potassium peroxodisulfate was added thereto, and then a mixture of 28.5 parts by weight of methyl methacrylate and 1.5 parts by weight of methyl acrylate as monomers for forming the outermost layer was dropped thereto with the dropping funnel over a period of 2 hours. After dropping, the reaction was continued while stirring at 70° C. for a further 30 minutes. It was confirmed by gas chromatography that all the monomers were consumed, and thus, the second polymerization was completed. The size (diameter) of the particle (multilayered polymer particle (B-a)) contained in the thus-obtained latex was measured by dynamic light scattering with the laser particle size analysis system PAR-III (manufactured by Otsuka Electronics Co., Ltd.). The size of the particle (B-a) was 0.15 μm.

The obtained latex was cooled to –20° C. for 24 hours so that the particles aggregated. Then, the aggregate was taken out and washed with 80° C. hot water three times, and dried under reduced pressure at 50° C. for 2 days. Thus, the multilayered polymer particle (B-a) was obtained. The obtained multilayered polymer particle (B-a) was a core-shell type two-layered structure particle having an oxygen absorption layer composed of 47.3 wt % of styrene, 10.5 wt % of butyl acrylate and 42.2 wt % of butadiene as the core layer, and a hard layer composed of 95 wt % of methyl methacrylate and 5 wt % of methyl acrylate as the outermost layer. The content of the butadiene (contained as the component in the diene polymer) in the multilayered polymer particle (B) was 29.5 wt % of the entire particle (B).

The obtained multilayered polymer particle (B-a) was press-molded at a mold temperature of 210° C. into a single-layer film having a thickness of 201 μm. When the refractive index and the haze value of the obtained film were measured, the results were 1.531 and 0.9%, respectively. The content of the carbon-carbon double bonds in the obtained multilayered polymer particle (B-a) was 0.005 eq/g.

Example 1

As the polyvinyl alcohol resin (A1), EVOH having an ethylene content of 32 mol %, a degree of saponification of 99.5%, and a melt flow rate (210° C., 2160 g load) of 8.4 g/10 min. was provided. When the phosphoric acid radical content and the Na, K, Mg ion contents of the EVOH were measured, the results were 100 ppm, 20 ppm, 60 ppm, and 20 ppm, respectively. The refractive index of the EVOH was 1.533.

Then, 95 parts by weight of the EVOH, 5 parts by weight of the multilayered polymer particle (B) prepared according to Synthesis Example 1 and 0.2121 parts by weight of cobalt (II) stearate (0.0200 parts by weight in terms of the cobalt atoms) as the transition metal salt (C) were dry-blended. The blend was extruded into pellets with a 30 mm ø biaxial extruder (TEX-30SS-30CRW-2V, manufactured by Japan Steel Works, Ltd.) at 210° C., a screw rotational speed of 300 rpm, and an extruded resin amount of 25 kg/hour. These pellets were dried at 30° C. under reduced pressure for 16 hours to give resin composition pellets. The melt flow rate (210° C., 2160 g load) of the resin composition was 9.5 g/10 min. Observation of the cutting plane of the pellets through an electron microscope confirmed that the multilayered polymer particles (B-a) were dispersed generally in the form of a particle having a size of about 1 μm in the matrix of the EVOH.

The resin composition pellets were press-molded at a mold temperature of 210° C. into a film having a thickness of 201 μm. The internal haze and the oxygen absorption amount of the obtained single-layer film were measured.

Then, the above resin composition and the following thermoplastic polyester resin were used in order to be subjected to coinjection blow molding by the following method to produce a multilayered bottle.

The thermoplastic polyester resin was produced by using germanium dioxide as a polymerization catalyst. The contents of the structural units of the polyester resin were obtained by NMR measurement. The results were that the contents of the terephthalic acid unit, ethylene glycol unit, and diethylene glycol unit of the polyester resin were 50.0 mol %, 48.9 mol %, and 1.1 mol %, respectively. The limiting viscosity, the melting point, and the glass transition temperature were 0.83 dl/g, 252° C. and 80° C., respectively.

In the production of the multilayered bottle, coinjection molding was performed using a coinjection stretch blow molding machine (ASB-50HT Model manufactured by Nissei ASB, for two moldings of 750 ml each), at 290° C. in the PES injection zone, 220° C. in the injection zone of the resin composition, 260° C. in the hot runner block in which the PES and the resin composition were combined, 15° C. in the injection mold core, and 15° C. in the injection mold cavity. Thus, a three-layered parison comprising two kinds of resin of PES/resin composition/PES was obtained.

Thereafter, the parison was heated to 105° C. at its surface, and subjected to stretch blow molding to obtain a three-layered coinjection blow-molded bottle composed of two kinds of resin. In the body part of the bottle, the mean thickness of the inner PES layer, the intermediate layer of the resin composition and the outer PES layer were 200 μm, 201 μm and 70 μm, respectively.

The haze of the body part of the obtained bottle and the oxygen transmission amount of the bottle were measured.

Table 1 shows the results of the above testing. Table 1 shows also the results of Examples 2 to 4 and Comparative Example 1.

Example 2

This example is the same as Example 1 except that 0.1060 parts by weight of cobalt (II) stearate (0.0100 parts by weight in terms of the cobalt atoms) were used.

Example 3

This example is the same as Example 1 except that 90 parts by weight of the same EVOH as used in Example 1, 10 parts by weight of the same multilayered polymer particle as used in Example 1, and 0.2121 parts by weight of cobalt (II) stearate (0.0200 parts by weight in terms of the cobalt atoms) were used.

Example 4

In this example, EVOH having an ethylene content of 44 mol %, a degree of saponification of 99.5%, a melt flow rate (210° C., 2160 g load) of 13.0 g/10 min, a phosphoric acid radical content of 75 ppm, a Na ion content of 75 ppm, a K ion content of 30 ppm, a Mg ion content of 20 ppm, and a refractive index of 1.528 was used. A composition and a bottle were produced in the same manner as in Example 1, except that 95 parts by weight of the above-described EVOH, 5 parts by weight of the same multilayered polymer particle as used in Example 1, and 0.2121 parts by weight of cobalt (II) stearate (0.0200 parts by weight in terms of the cobalt atoms) were used.

Comparative Example 1

The same EVOH resin as used in Example 1 was used alone, and was press-molded at a mold temperature of 210° C. into a film having a thickness of 20 μm. When the internal haze of the obtained single-layer film was measured, the result was 0.7%. When the oxygen absorption rate of this EVOH film was measured in the same manner as the oxygen absorption rate of the resin composition in the examples, the result was 0.000 ml/m²·day.

Then, this EVOH resin and the same thermoplastic polyester resin as used in Example 1 were used in order to be subjected to coinjection blow molding in the same manner as in Example 1. Thus, a three-layered coinjection blow-molded bottle comprising two kinds of resin was obtained. In the body part of the bottle, the mean thickness of the inner PES layer, that of the intermediate EVOH layer and that of the outer PES layer were 200 μm, 20 μm and 70 μm, respectively.

When the haze of the body part of the obtained bottle and the oxygen transmission amount of the bottle were measured, the results were 2.4% and 0.02 cc/container·day·atm, respectively.

TABLE 1

| | EVOH | | | | Resin composition | | Multilayered bottle | |
|---|---|---|---|---|---|---|---|---|
| | Ethylene content (mol %) | (Parts by weight) | Multilayered polymer particle (B) (Parts by weight) | Transition metal salt (C) (ppm)*a) | Oxygen absorption rate (ml/m² · day) | Haze (%) | Oxygen transmission amount*b) | Haze (%) |
| Example 1 | 32 | 95 | 5 | 200 | 0.418 | 0.9 | 0.00 | 2.3 |
| Example 2 | 32 | 95 | 5 | 100 | 0.230 | 0.8 | 0.00 | 2.4 |
| Example 3 | 32 | 90 | 10 | 200 | 0.510 | 1.3 | 0.00 | 2.6 |
| Example 4 | 44 | 95 | 5 | 200 | 1.258 | 1.5 | 0.00 | 2.9 |
| Comparative Example 1 | 32 | 100 | 0 | 0 | 0.000 | 0.7 | 0.02 | 2.4 |

*a)In terms of metal element
*b)ml/container · day · atm

Synthesis Example 2
Production Example of the Multilayered Polymer Particle (B-b)

As monomers for forming the core layer, 16 parts by weight of styrene, 13.5 parts by weight of butyl acrylate and 40.5 part by weight of butadiene were used, and as monomers for forming the outermost layer, 10 parts by weight of styrene, 19 parts by weight of methyl methacrylate and 1 part by weight of methyl acrylate were used to obtain a multilayered polymer particle (multilayered polymer particle (B-b)) in the same manner as in Synthesis Example 1. The size (diameter) of this particle was 0.13 µm.

The obtained multilayered polymer particle (B-b) was a core-shell type two-layered structure particle having the core layer (oxygen absorption layer) composed of 22.9 wt % of styrene, 19.2 wt % of butyl acrylate and 57.9 wt % of butadiene, and the outermost layer (hard layer) composed of 33.3 wt % of styrene, 63.4 wt % of methyl methacrylate and 33 wt % of methyl acrylate. The content of the butadiene (contained as the copolymerization component in the diene polymer) in the multilayered polymer particle (B-b) was 40.5 wt % of the entire particle (B-b).

The obtained multilayered polymer particle (B-b) was press-molded at a mold temperature of 210° C. into a single-layer film having a thickness of 20 µm. When the refractive index and the haze value of the obtained film were measured, the results were 1.525 and 0.8%, respectively. The content of the carbon—carbon double bonds in the obtained multilayered polymer particle (B-b) was 0.007 eq/g.

Synthesis Example 3
Production Example of the Multilayered Polymer Particle (B-c)

As monomers for forming the core layer, 54.1 parts by weight of styrene and 24.7 parts by weight of butadiene were used, and as monomers for forming the outermost layer, 16.2 parts by weight of styrene, 4.7 parts by weight of methyl methacrylate and 0.3 parts by weight of methyl acrylate were used to obtain a multilayered polymer particle (multilayered polymer particle (B-c)) in the same manner as in Synthesis Example 1. The size (diameter) of this particle was 0.11 µm.

The obtained multilayered polymer particle (B-c) was a core-shell type two-layered structure particle having the core layer (oxygen absorption layer) composed of 68.7 wt % of styrene and 31.3 wt % of butadiene and the outermost layer (hard layer) composed of 76.4 wt % of styrene, 22.2 wt % of methyl methacrylate and 1.4 wt % of methyl acrylate. The content of the butadiene (contained as the copolymerization component in the diene polymer) in the multilayered polymer particle (B-c) was 24.7 wt % of the entire particle (B-c).

The obtained multilayered polymer particle (B-c) were press-molded at a mold temperature of 210 ° C. into a single-layer film having a thickness of 20 µm. When the refractive index and the haze value of the obtained film were measured, the results were 1.570 and 0.9%, respectively. The content of the carbon-carbon double bonds in the obtained multilayered polymer particle (B-c) was 0.0045 eq/g.

Example 5

In this example, Nylon 6 (Ube Kosan K K, 1024fdx41, IV value: 3.68) was used as a polyamide resin. When the refractive index of Nylon 6 was measured, the result was 1.525.

Then, 95 parts by weight of the Nylon 6, 5 parts by weight of the multilayered polymer particle (B-b) prepared according to Synthesis Example 2 and 0.2121 parts by weight of cobalt (II) stearate (0.0200 parts by weight in terms of the cobalt atoms) as the transition metal salt (C) were dry-blended. The blend was extruded into pellets with a 30 mm ⌀ biaxial extruder (TEX-30SS-30CRW-2V manufactured by Japan Steel Works, Ltd.) at 240° C., a screw rotational speed of 300 rpm, and an extruded resin amount of 25kg/hour. These pellets were dried at 80° C. under reduced pressure for 10 hours to give resin composition pellets. Observation of the cutting plane of the pellets through an electron microscope confirmed that the multilayered polymer particles (B-b) were dispersed generally in the form of a particle having a size of about 1 µm in the matrix of the Nylon 6.

The resin composition pellets were subjected to extrusion molding at 240° C. into a single-layer film having a thickness of 20 µm. The internal haze of the obtained film was measured. Furthermore, the oxygen absorption amount of the film was measured, and the oxygen absorption rate was calculated.

Table 2 shows the results of the above testing. Table 2 shows also the results of following Examples 6 and 7 and Comparative Examples 2 to 4.

Example 6

In this example, polyethylene terephthalate (Kuraray Co., Ltd., KS750RC, IV value: 0.74) was used as a polyester resin. When the refractive index of the polyethylene terephthalate was measured, the result was 1.575.

Then, 95 parts by weight of the polyethylene terephthalate, 5 parts by weight of the multilayered polymer particle (B-c) prepared according to Synthesis Example 3 and 0.2121 parts by weight of cobalt (II) stearate (0.0200 parts by weight in terms of the cobalt atoms) as the transition metal salt (C) were dry-blended. The blend was extruded into pellets with a 30 mm o biaxial extruder (TEX-30SS-30CRW-2V manufactured by Japan Steel Works, Ltd.) at 270° C., a screw rotational speed of 300 rpm, and an extruded resin amount of 25 kg/hour. These pellets were dried at 80° C. under reduced pressure for 10 hours to give resin composition pellets. Observation of the cutting plane of the pellets through an electron microscope confirmed that the multilayered polymer particles (B-c) were dispersed generally in the form of a particle having a size of about 1 μm in the matrix of the polyethylene terephthalate.

Then, the resin composition pellets were subjected to extrusion molding at 270° C. into a single-layer film having a thickness of 20 μm. The internal haze of the obtained single-layer film was measured. Furthermore, the oxygen absorption amount of the film was measured, and the oxygen absorption rate was calculated.

Comparative Example 2

The same Nylon 6 as used in Example 5 was used alone and was subjected to extrusion molding at 240° C. into a single-layer film having a thickness of 20 μm. The haze of the obtained film was measured. Furthermore, the oxygen absorption amount of the film was measured, and the oxygen absorption rate was calculated. Comparative Example 3

The same polyethylene terephthalate as used in Example 6 was used alone and was subjected to extrusion molding at 270° C. into a single-layer film having a thickness of 20 μm. The haze of the obtained film was measured. Furthermore, the oxygen absorption amount of the film was measured, and the oxygen absorption rate was calculated.

Synthesis Example 4
Production Example of the Multilayered Polymer Particle (B-d)

As monomers for forming the core layer, 16 parts by weight of styrene, 13.5 parts by weight of butyl acrylate and 40.5 parts by weight of butadiene were used, and as monomers for forming the outermost layer, 10 parts by weight of styrene, 18.9 parts by weight of methyl methacrylate, 1 part by weight of methyl acrylate and 0.1 parts by weight of octylmercaptan were used to obtain the multilayered polymer particle (multilayered polymer particle (B-d)) in the same manner as in Synthesis Example 1. The size (diameter) of this particle was 0.12 μm.

The obtained multilayered polymer particle (B-d) was a core-shell type two-layered structure particle having the core layer (oxygen absorption layer) composed of 22.9 wt % of styrene, 19.2 wt % of butyl acrylate and 57.9 wt % of butadiene and the outermost layer (hard layer) composed of 33.4 wt % of styrene, 63.0 wt % of methyl methacrylate, 3.3 wt % of methyl acrylate and 0.3 wt % of octylmercaptan. The content of the butadiene (contained as the copolymerization component in the diene polymer) in the multilayered polymer particle (B-d) was 40.5 wt % of the entire particle (B-d).

The obtained multilayered polymer particle (B-d) was press-molded at a mold temperature of 210 ° C. into a single-layer film having a thickness of 20 μm. When the refractive index and the haze value of the obtained film were measured, the results were 1.525 and 0.5%, respectively. The content of the carbon-carbon double bonds in the obtained multilayered polymer particle (B-d) was 0.007 eq/g.

Example 7

In this example, 100 parts by weight of the multilayered polymer particle (B-d) prepared according to Synthesis Example 4 and 0.2121 parts by weight of cobalt (II) stearate (0.0200 parts by weight in terms of the cobalt atoms) were dry-blended. The blend was extruded into pellets with a 30 mm ø biaxial extruder (TEX-30SS-30CRW-2V manufactured by Japan Steel Works, Ltd.) at 220° C., a screw rotational speed of 300 rpm, and an extruded resin amount of 25 kg/hour. These pellets were dried at 80° C. under reduced pressure for 10 hours to give resin composition pellets.

The resin composition pellets were subjected to extrusion molding at 220° C. into a single-layer film. The internal haze of the obtained film was measured. Furthermore, the oxygen absorption amount of the film was measured, and the oxygen absorption rate was calculated.

Comparative Example 4

The multilayered polymer particle (B-d) prepared according to Synthesis Example 4 was used alone, and was subjected to extrusion molding at 220° C. into a single-layer film having a thickness of 20 μm. The internal haze of the obtained film was measured. Furthermore, the oxygen absorption amount of the film was measured, and the oxygen absorption rate was calculated.

TABLE 2

| | Thermoplastic resin (A) | | Multilayered polymer particle (B) (Parts by weight) | Transition metal salt (C) (ppm)[*a)] | Resin composition | |
|---|---|---|---|---|---|---|
| | Resin | (Parts by weight) | | | Oxygen absorption rate (ml/m$^2$ · day) | Haze (%) |
| Example 5 | Nylon 6 | 95 | 5 | 200 | 0.280 | 0.9 |
| Example 6 | Polyethylene terephthalate | 95 | 5 | 200 | 0.215 | 0.6 |
| Example 7 | — | — | 100 | 200 | 3.183 | 0.5 |
| Comparative Example 2 | Nylon 6 | 100 | 0 | 200 | 0.000 | 0.7 |
| Comparative Example 3 | Polyethylene terephthalate | 100 | 0 | 200 | 0.000 | 0.5 |
| Comparative Example 4 | — | — | 100 | 0 | 0.000 | 0.5 |

[*a)]In terms of metal element

What is claimed is:
1. A thermoplastic resin composition, comprising:
a thermoplastic resin (A);

a multilayered polymer particle (B); and a transition metal salt (C);

wherein the multilayered polymer particle (B) comprises at least one oxygen absorption layer;

wherein the oxygen absorption layer comprises a diene polymer (B1) comprising a polymer unit obtained from a conjugated diene monomer, wherein an internal haze value of a non-oriented film, having a thickness of 20 μm and which is obtained by press-molding the multilayered polymer particle (B) at a mold temperature of 210° C., is 10% or less; and wherein the transition metal salt (C) is contained in an amount of 1 to 5000 ppm in terms of a metal element thereof.

2. A thermoplastic resin composition, comprising:

a thermoplastic resin (A); and a multilayered polymer particle (B);

wherein the multilayered polymer particle (B) has at least one oxygen absorption layer;

wherein the oxygen absorption layer comprises a diene polymer (B1) comprising a polymer unit obtained from a conjugated diene monomer, wherein an internal haze value of a non-oriented film, having a thickness of 20 μm and which is obtained by press-molding the multilayered polymer particle (B) at a mold temperature of 210° C., is 10% or less; and wherein an oxygen absorption rate of the composition is 0.01 ml/m²·day or more.

3. The resin composition according to claim 1, comprising the thermoplastic resin (A) in an amount of 10 to 99.9 wt %, and the multilayered polymer particle (B) in an amount of 0.1 to 90 wt %.

4. The resin composition according to claim 1, wherein the thermoplastic resin (A) is at least one resin selected from the group consisting of a polyvinyl alcohol resin (A1), a polyamide resin (A2), and a polyester resin (A3).

5. The resin composition according to claim 1, wherein the diene polymer (B1) is at least one polymer selected from the group consisting of a polymer having only a polymer unit obtained from a conjugated diene monomer, and a polymer comprising a polymer unit obtained from a conjugated diene monomer and a polymer unit obtained from a copolymerizable vinyl monomer.

6. The resin composition according to claim 1, wherein the transition metal salt (C) is at least one salt selected from the group consisting of iron salts, nickel salts, copper salts, manganese salts, and cobalt salts.

7. The resin composition according to claim 1, wherein the thermoplastic resin (A) is a polyvinyl alcohol resin (A1); and wherein the polyvinyl alcohol resin (A1) is an ethylene-vinyl alcohol copolymer having an ethylene content of 3 to 60 mol % and a degree of saponification of 90% or more.

8. The resin composition according to claim 1, wherein said multilayered polymer particle (B) comprises carbon-carbon double bonds in an amount of 0.0001 eq/g or more based on the weight of the particle (B).

9. The resin composition according to claim 1, wherein a difference in the refractive index between the thermoplastic resin (A) and the multilayered polymer particle (B) is 0.01 or less.

10. The resin composition according to claim 1, wherein a plurality of multilayered polymer particles (B) are dispersed in a matrix of the thermoplastic resin (A).

11. A thermoplastic resin composition, comprising:

a multilayered polymer particle (B); and a transition metal salt (C);

wherein the multilayered polymer particle (B) comprises at least two thermoplastic resin layers;

wherein a first layer of said at least two thermoplastic resin layers is an oxygen absorption layer comprising a resin or a resin mixture comprising a diene polymer (B1) comprising 10 mol % or more of a polymer unit obtained from a conjugated diene monomer, based on a total amount of the resin of the oxygen absorption layer;

wherein a second layer of said thermoplastic resin layers does not substantially contain the diene polymer (B1), and the second layer is the outermost layer of the multilayered polymer particle (B);

wherein an internal haze value of a non-oriented film, having a thickness of 20 μm and which is obtained by press-molding the multilayered polymer particle (B) at a mold temperature of 210° C., is 10% or less; and wherein the transition metal salt (C) is contained in an amount of 1 to 5000 ppm in terms of a metal element thereof.

12. A multilayered structure, comprising:

the thermoplastic resin composition according to claim 1.

13. A multilayered container, comprising:

the thermoplastic resin composition according to claim 1.

14. A multilayered film, comprising:

the thermoplastic resin composition according to claim 1, and having a total thickness of 300 μm or less.

15. A multilayered container obtained by molding the multilayered film according to claim 14.

16. A multilayered container, comprising: a layer of the thermoplastic resin composition according to claim 1, and a layer made of a thermoplastic polyester.

17. The resin composition according to claim 2, comprising the thermoplastic resin (A) in an amount of 10 to 99.9 wt %, and the multilayered polymer particle (B) in an amount of 0.1 to 90 wt %.

18. The resin composition according to claim 2, wherein the thermoplastic resin (A) is at least one resin selected from the group consisting of a polyvinyl alcohol resin (A1), a polyamide resin (A2), and a polyester resin (A3).

19. The resin composition according to claim 2, wherein the diene polymer (B1) is at least one polymer selected from the group consisting of a polymer having only a polymer unit obtained from a conjugated diene monomer, and a polymer comprising a polymer unit obtained from a conjugated diene monomer and a polymer unit obtained from a copolymerizable vinyl monomer.

20. The resin composition according to claim 2, wherein the transition metal salt (C) is at least one salt selected from the group consisting of iron salts, nickel salts, copper salts, manganese salts, and cobalt salts.

21. The resin composition according to claim 2, wherein the thermoplastic resin (A) is a polyvinyl alcohol resin (A1); and wherein the polyvinyl alcohol resin (A1) is an ethylene-vinyl alcohol copolymer having an ethylene content of 3 to 60 mol % and a degree of saponification of 90% or more.

22. The resin composition according to claim 2, wherein said multilayered polymer particle (B) comprises carbon-carbon double bonds in an amount of 0.0001 eq/g or more based on the weight of the particle (B).

23. The resin composition according to claim 2, wherein a difference in the refractive index between the thermoplastic resin (A) and the multilayered polymer particle (B) is 0.01 or less.

24. The resin composition according to claim 2, wherein a plurality of multilayered polymer particles (B) are dispersed in a matrix of the thermoplastic resin (A).

25. The resin composition according to claim 1, which is transparent.

* * * * *